US007161273B2

(12) United States Patent
Akiba et al.

(10) Patent No.: US 7,161,273 B2
(45) Date of Patent: Jan. 9, 2007

(54) ANTISTATIC MECHANISM OF AN ELECTROSTATIC ACTUATOR

(75) Inventors: Akira Akiba, Tsukuba (JP); Keisuke Uno, Ushiku (JP); Masao Jojima, Tsukuba (JP); Tomonori Seki, Ushiku (JP); Koji Sano, Ushiku (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/287,355

(22) Filed: Nov. 4, 2002

(65) Prior Publication Data

US 2003/0102771 A1 Jun. 5, 2003

(30) Foreign Application Priority Data

Nov. 6, 2001 (JP) ............................ 2001-340293

(51) Int. Cl.
*H02N 1/00* (2006.01)

(52) U.S. Cl. ..................................................... 310/309

(58) Field of Classification Search ................ 310/309; 200/181; 385/18

See application file for complete search history.

(56) References Cited

U.S. PATENT DOCUMENTS

| | | | | |
|---|---|---|---|---|
| 5,367,429 | A * | 11/1994 | Tsuchitani et al. | 361/280 |
| 5,428,259 | A | 6/1995 | Suzuki | 310/309 |
| 5,554,304 | A | 9/1996 | Suzuki | 216/2 |
| 5,554,604 | A | 9/1996 | Bonfils et al. | 514/182 |
| 5,627,396 | A | 5/1997 | James et al. | 257/415 |
| 5,665,997 | A * | 9/1997 | Weaver et al. | 257/414 |
| 5,903,428 | A * | 5/1999 | Grimard et al. | 361/234 |
| 6,054,659 | A * | 4/2000 | Lee et al. | 200/181 |
| 6,162,657 | A | 12/2000 | Schiele et al. | 438/52 |
| 6,191,518 | B1 * | 2/2001 | Suzuki | 310/309 |
| 6,271,955 | B1 * | 8/2001 | Atobe et al. | 359/291 |
| 6,307,452 | B1 | 10/2001 | Sun | 333/262 |
| 6,376,787 | B1 * | 4/2002 | Martin et al. | 200/181 |
| 6,452,124 | B1 * | 9/2002 | York et al. | 200/181 |
| 6,480,646 | B1 * | 11/2002 | Farmer et al. | 385/18 |

(Continued)

FOREIGN PATENT DOCUMENTS

EP 0 709 911 5/1999

(Continued)

OTHER PUBLICATIONS

Patent Abstracts of Japan, Publication No. 09-257833, Publication Date: Oct. 3, 1997 (1 page).

(Continued)

*Primary Examiner*—Karl Tamai
(74) *Attorney, Agent, or Firm*—Osha Liang L.L.P.

(57) ABSTRACT

A fixed voltage and a movable electrode are placed face to face with each other, and an insulating film is formed on the surface of the fixed electrode. The insulating film is made of a nitride film (SiN) as a main material, with oxide films ($SiO_2$) being formed on the front and rear surfaces of the nitride film. Moreover, a plurality of protrusions are formed on an area facing the movable electrode of the upper face of the insulating film. The charge quantity in the insulating film is mainly determined by a film thickness of the oxide film, and the nitride film is used for maintaining a sufficient film thickness required for the voltage proof characteristic. Thereby, it is possible to suppress variations in operational voltage characteristics such as on-voltage and off-voltage in an electrostatic actuator so as to prevent phenomena in which the electrostatic actuator fails to turn on even when a rated voltage is applied to the electrostatic actuator and in which the electrostatic actuator fails to turn off even when the driving voltage is turned off.

4 Claims, 25 Drawing Sheets

U.S. PATENT DOCUMENTS

| | | | | |
|---|---|---|---|---|
| 6,483,395 | B1 | 11/2002 | Kasai et al. | 333/105 |
| 6,486,425 | B1 * | 11/2002 | Seki | 200/181 |
| 6,566,617 | B1 | 5/2003 | Suzuki et al. | 200/181 |
| 6,635,919 | B1 * | 10/2003 | Melendez et al. | 257/312 |
| 2002/0005341 | A1 | 1/2002 | Seki | 200/181 |

FOREIGN PATENT DOCUMENTS

| | | |
|---|---|---|
| JP | 62-30778 | 8/1987 |
| JP | 8-19270 | 1/1996 |
| JP | 09-018020 | 1/1997 |
| JP | 9-238482 | 9/1997 |
| JP | 9-257833 | 10/1997 |
| JP | 2928752 | 5/1999 |
| JP | 2000-31397 A | 1/2000 |
| JP | 2000-173375 | 6/2000 |
| JP | 3095642 | 8/2000 |
| WO | WO-00/31819 | 6/2000 |

OTHER PUBLICATIONS

Patent Abstracts of Japan, Publication No. 2000-173375, Publication Date: Jun. 23, 2000 (1 page).

Patent Abstracts of Japan, Publication No:.08-019270, Publication Date: Jan. 19, 1996 (1 page).

Patent Abstracts of Japan, Publication No.: 09-238482, Publication Date: Sep. 9, 1997 (1 page).

Patent Abstracts of Japan, Publication No. 09-163761, Publication Date: Jun. 20, 1997, 2 pages, corresponds to reference A6 listed above.

Patent Abstracts of Japan, Publication No. 08-140367, Publication Date: May 31, 1996, 2 pages, corresponds to reference A7 listed above.

Patent Abstracts of Japan, Publication No. 09-257833, Publication Date: Oct. 3, 1997, 2 pages.

Patent Abstracts of Japan, Publication No. 2000-031397, Publication Date: Jan. 28, 2000, 2 pages.

Patent Abstracts of Japan, Publication No. 09-018020, Publication Date: Jan. 17, 1997, 2 pages.

English Abstract of Utility Model of JP58-17753 (corresponds to JP62-30778); 1 page.

English Abstract of Japanese Patent JP2928752; 2 pages.

English Abstract of Japanese Patent JP 3095642; 2 pages.

English Abstract of JP9-257833; 2 pages.

English Abstract of JP2000-031397A; 2 pages.

English Abstract of JP09-018020; 2 pages.

Patent Abstracts of Japan, Publication No.: 2000-164104, Publication Date: Jun. 16, 2000, 1 page.

European Search Report dated Dec. 6, 2004, 4 pages.

* cited by examiner

PRIOR ART

Prior Art

Prior Art

Prior Art

ANTISTATIC MECHANISM OF AN ELECTROSTATIC ACTUATOR

BACKGROUND OF INVENTION

1. Field of the Invention

The present invention relates to an electrostatic actuator, an electrostatic micro-relay and other devices using the same.

2. Description of the Background Art

FIG. 1 is an exploded perspective view that shows a structure of a conventional electrostatic actuator and FIG. 2 shows a cross-sectional view thereof. This electrostatic actuator 1, which is disclosed in Japanese Laid-Open Patent Application No. 2000-164104,is mainly constituted by a fixed substrate 2 and a movable substrate 3. The fixed substrate 2 is made of a glass substrate having a fixed electrode 4 and a pair of fixed contacts 5, 6 formed on the upper face thereof. The surface of the fixed electrode 4 is coated with an insulating film 7 made from an oxide. Moreover, the fixed contacts 5, 6 are respectively connected to connection pads 10, 11 on the fixed substrate 2 through respective wires 8, 9.

The movable substrate 3 made from an Si substrate is provided with a movable electrode 13 supported by four elastic beams 12 in the center portion thereof, and a movable contact 15 is placed on the center portion of the lower face of the movable electrode 13 through an insulating layer 14. An anchor 16 protrudes from a peripheral portion of the lower face of the movable substrate 3 so that, when the movable substrate 3 is fixed on the upper face of the fixed substrate 2 by the anchor 16, the movable electrode 13 and the fixed electrode 4 are aligned face to face with each other with a space in between; thus, the movable contact 15 is aligned face to face with the fixed contacts 5, 6 with a space in between in a manner so as to bridge a space between the fixed contacts 5 and 6.

In this arrangement, when a driving voltage, applied between the fixed electrode 4 and the movable electrode 13, has reached a predetermined voltage value, the movable electrode 13 is attracted toward the fixed electrode 4 side by an electrostatic attracting force that is exerted between the fixed electrode 4 and the movable electrode 13 so that the movable electrode 13 is allowed to adhere to the fixed electrode 4 through the insulating film 7 with the elastic beam 12 being distorted. In the case when the movable electrode 13 has adhered to the fixed electrode 4, before or after this process, the movable contact 15 is pressed between the fixed contacts 5 and 6 so that the fixed contacts 5, 6 are electrically closed by the movable contact 15 so that a pair of connection pads 10 and 11 are allowed to conduct to each other.

Therefore, in the case of an optimal electrostatic actuator, its CV characteristic is indicated by FIG. 3. Here, the CV characteristic of the electrostatic actuator is represented by the relationship between a driving voltage Vdrive applied between the fixed electrode 4 and the movable electrode 13 and a capacitance C between the two electrodes 4 and 13. In FIG. 3, C1 represents a value of the capacitance C in a state where no driving voltage is applied between the movable electrode 13 and the fixed electrode 4, C2 represents a value of the capacitance C in a state where the movable electrode 13 adheres to the fixed electrode 4 through the insulating film 7, on-voltage Von is a value of the driving voltage Vdrive at the time when the movable electrode 13 is made to adhere to the fixed electrode 4 (or is released from the fixed electrode 4), and in the case of an optimal electrostatic actuator, this CV characteristic has a symmetrical profile with respect to the point of the driving voltage Vdrive=0 volt.

In the case of a conventional electrostatic actuator, for example, the above-mentioned electrostatic actuator, when a driving voltage has been applied between the movable electrode and the fixed electrode for a long time, the insulating film on the fixed electrode is gradually charged, with the result that a variation occurs in operational voltage characteristics, such as on-voltage and off-voltage in the electrostatic actuator. Such a variation in the operational voltage characteristics is caused by the generation of an electrical potential difference other than the driving voltage Vdrive that is externally applied between the fixed electrode and the movable electrode for charging; therefore, when such a variation occurs in the operational voltage characteristics in the electrostatic actuator, the resulting problems are that the electrostatic actuator is not operated even when a rated on-voltage is applied thereto, and that the electrostatic actuator is not turned off even when the applied voltage is turned off. The following description will discuss the causes of variations in the operational voltage characteristics in detail.

The ways of charging are classified into two ways. Here, these ways are respectively referred to as a plus shift and a minus shift. The plus shift refers to a charging in which the center value of the CV characteristic is shifted toward the plus side of the driving voltage (see FIG. 6). The cause of the plus shift is that a charge transfer (transfer of charge) occurs at a portion on which the insulating film on the fixed electrode and the movable electrode come into contact with each other with the result that the insulating film is charged. The charge transfer is a phenomenon in which, when the contact portion of an insulator and a conductor is subjected to an electric field and heat, a charge is accumulated in the insulator, thereby charging the insulator.

For example, as shown in FIG. 4, in the case when a driving voltage Vdrive is applied between the movable electrode 13 and the fixed electrode 4, with the movable electrode 13 having a positive electric potential, at the contact portion between the movable electrode 13 and the insulating film 7, electrons e on the surface of the insulating film 7 are shifted toward the movable electrode 13 with holes h being left in the insulating film 7 so that the insulating film 7 is positively charged. However, in the case when the polarity of a driving voltage to be applied between the movable electrode and the fixed electrode is reversed so that the movable electrode has a negative electrical potential, the insulating film is negatively charged.

In the event of such a plus shift, the applied voltage Vapp between the movable electrode 13 and the fixed electrode 4 is lowered by a voltage $\Delta Vp$ (>0) corresponding to the charge quantity due to the plus shift charging to a level represented by the following equation:

$$Vapp=Vdrive-\Delta Vp,$$

with the result that the apparent on-voltage is raised to $Von+\Delta Vp$ (here, Von is a value of the on-voltage in the case of no charge). Therefore, the problem with the plus shift is exerted as an increase in the minimum driving voltage (apparent on-voltage) to be used for closing the fixed contacts 5, 6 by using the movable contact 15, and in the case of a great plus shift, the electrostatic actuator fails to turn on even when the rated voltage is applied.

Moreover, the minus shift refers to a charging in which the center value of the CV characteristic is shifted toward the minus side of the driving voltage (see FIG. 6). The minus shift is caused by an ionic charging. In other words, this is caused by the fact that ions, generated in processes such as an anodic bonding, are diffused in the insulating film of the oxide so that positive and negative ions diffused in the insulating film are shifted by an electric field applied between the movable electrode and the fixed electrode toward the mutually opposite sides.

For example, as shown in FIG. 5, in the case when a driving voltage Vdrive is applied between the movable electrode 13 and the fixed electrode 4, with the movable electrode 13 having a positive electric potential, anions p, diffused in the insulating film 7 of the oxide, are shifted in the direction toward the interface to the fixed electrode 4 with anions n being shifted in the direction of the surface of the insulating film 7 so that the surface of the insulating film 7 is negatively charged. However, in the case when the polarity of a driving voltage to be applied between the movable electrode and the fixed electrode is reversed so that the movable electrode has a negative electrical potential, the insulating film is positively charged.

In the event of such a minus shift, the applied voltage Vapp between the movable electrode 13 and the fixed electrode 4 is raised by a voltage ΔVn (>0) corresponding to the charge quantity due to the ionic charging to a level represented by the following equation:

$$Vapp=Vdrive+\Delta Vn,$$

with the result that the apparent on-voltage is lowered to Von−ΔVn (here, Von is a value of the on-voltage in the case of no charge). Therefore, the problem with the minus shift is exerted as a decrease in the minimum driving voltage (apparent on-voltage) to be used for opening the fixed contacts, with the result that, even when the driving voltage Vdrive is set to 0 volt, the electrostatic actuator fails to turn off or hardly turns off (that is, the electrostatic actuator is stuck, or susceptible to sticking).

In this manner, the insulating film is always charged while the electrostatic actuator is being driven, resulting in a failure to ensure the designed performances. FIG. 6 shows a change in the CV characteristic before and after a thermal endurance test carried out on an electrostatic actuator. The CV characteristic F0, indicated by broken lines and rhomboidal shape points in FIG. 6, represents an initial characteristic prior to the conduction of the thermal endurance test, which shows a characteristic that is symmetrical with the driving voltage Vdrive. The CV characteristics F+, F−, indicated by solid lines shown in FIG. 6, represent the CV characteristics after a thermal endurance test carried out under conditions of an ambient temperature of 85° C., a driving voltage of 24 volts and test time of 100 hours; and F+ indicated by solid lines and square points, represent plus shifts, while F−, indicated by solid lines and triangular points, represent minus shifts.

SUMMARY OF INVENTION

In one aspect, the present invention relates to an electrostatic actuator which is provided with means for controlling charging phenomena such as plus shift and minus shift so that it becomes possible to control operational voltage characteristics such as on-voltage and off-voltage. Moreover, in another aspect, the present invention provides an electrostatic micro-relay using the above-mentioned electrostatic actuator and other devices.

In one embodiment, an electrostatic actuator of the present invention is provided with: a first electrode and a second electrode that are placed face to face with each other; and an insulating film that is formed on an opposite face of at least one electrode of the two electrodes at an area where the first electrode and the second electrode are made face to face with each other so that at least one of the first electrode and the second electrode is driven by an electrostatic force that is exerted when a voltage is applied between the first electrode and second electrode to allow the first electrode and second electrode to contact each other with the insulating film being interpolated in between, and in this arrangement, at least one of the first electrode and second electrode has a structure for controlling charge quantity.

In accordance with one embodiment of an electrostatic actuator of the present invention, since the charge-quantity controlling structure is provided, it is possible to control the quantities of positive and negative charges in the insulating film. For example, it becomes possible to reduce the quantity of a positive or negative charge caused by, for example, charge transfer and the like, or it becomes possible to reduce the quantity of a positive or negative charge caused by ionic charging and the like. As a result, it is possible to control the operational voltage characteristics such as on-voltage and off-voltage of the electrostatic actuator by controlling the charging phenomena such as plus shift and minus shift.

Moreover, in one aspect of the present invention, the above-mentioned charge-quantity controlling structure has such an arrangement that the quantities of positive and negative charges, exerted when a voltage is applied between the first and second electrodes, are respectively controlled so that the sum of the quantities of charge in the insulating film is desirably controlled. In this aspect, the quantity of positive charge and the quantity of negative charge are mutually cancelled so that the entire charge quantity (total quantity) generated in the insulating film is controlled. In particular, it is not necessary to reduce the quantity of positive charge and the quantity of negative charge, and by making the quantity of positive charge and the quantity of negative charge cancel with each other, it becomes possible to reduce the entire charge quantity generated in the insulating film, and consequently to control the charge quantity to, for example, zero.

In another aspect of the present invention, the thickness of the insulating film is adjusted so that the charge quantity in the insulating film is controlled. In accordance with this aspect, by adjusting the thickness of the insulating layer (in particular, the thickness of the oxide film), the quantity of positive or negative charge of the insulating film due to, for example, ionic charging can be controlled. Moreover, in the case when the insulating film is constituted by a plurality of layers made of different materials, the charge quantity in the insulating film is preferably controlled based upon the thickness of a layer that is directly made in contact with the first electrode or the second electrode.

Furthermore, in a preferred aspect, the insulating film comprises an oxide film and a nitride film; thus, another effect for reducing the charge quantity due to ionic charging is obtained, and it becomes possible to optimize the manufacturing processes and consequently to manufacture an electrostatic actuator easily with high yield. In other words, the nitride film has a property of hardly transmitting ions, and since the application of a nitride film makes it possible to reduce the thickness of the oxide film while a proper voltage-resistant property is maintained, it becomes possible to reduce the charge quantity in the insulating film due to the ionic charging. In particular, the film is formed as a silicon oxide film or a silicon nitride film so that it becomes possible to manufacture an electrostatic actuator easily with high yield.

It is preferable to coat the surface of the above-mentioned nitride film with the above-mentioned oxide film. In particular, the nitride film surface on the side opposite to the electrode fixing the insulating film is preferably covered with the oxide film. When the nitride film is exposed, the nitride film is susceptible to damages upon manufacturing, causing degradation in the processing precision; however, it is possible to prevent damages to the nitride film by coating the nitride film with the oxide film.

Moreover, the above-mentioned insulating layer may be formed by a single material. The formation of the insulating film using a single material makes it possible to simplify the structure of the insulating film, and consequently to easily manufacture the insulating film.

In another aspect of the present invention, the charge quantity in the insulating film is controlled based upon a contact area of a portion with and from which the first electrode and the second electrode are made in contact and separated with the insulating film being interpolated in between, in the area on which the first electrode and the second electrode are aligned face to face with each other. In accordance with this aspect, by adjusting the contact area of a portion with and from which those electrodes are made in contact and separated, it is possible to control the quantity of positive or negative charge of the insulating film due to, for example, a charge transfer.

For example, at least one protrusion may be formed on at least one of the surfaces of the electrodes to and from which the contact and separation are made; thus, it is possible to control the entire contact area of the portion to and from which the contact and separation are made by using the protrusion (for example, the number and the respective contact areas of the protrusions). The surface of this protrusion is preferably formed into a spherical shape. The formation of the surface of the protrusion into a spherical shape makes it possible to reduce the contact area to the other electrode, and consequently to reduce the charge quantity due to a charge transfer effectively; thus, it is also possible to increase the space filling rate, and to strengthen the electrostatic force between the two electrodes.

In still another aspect of the present invention, an area which corresponds to a contact surface at a portion with and from which the first electrode and the second electrode are made in contact and separated lacks at least one of the electrodes. In accordance with this aspect, because an electric field generated between the two electrodes is not applied to the contact portion, it is possible to reduce the charge quantity due to a charge transfer.

An electrostatic actuator according to embodiments of the present invention may be applied to an electrostatic micro-relay. With this electrostatic micro-relay, it is possible to transmit dc currents as well as high-frequency signals with low loss, and consequently to maintain a stable characteristic for a long time.

Furthermore, an electrostatic actuator according to embodiments of the present invention may be applied to various devices; and examples thereof include a radio device in which the electrostatic micro-relay is installed so as to open and close an electric signal between the antenna and the inner circuit, a measuring device in which the electrostatic micro-relay is installed so as to open and close an electric signal between a measuring subject and the inner circuit, and a personal digital assistance in which the electrostatic micro-relay is installed so as to open and close the inner electric signal. In accordance with these devices, it is possible to transmit signals with high precision for a long time while reducing the load imposed on the amplifier, etc. used in the inner circuit. Moreover, it is possible to miniaturize the device and also to reduce power consumption; thus, the present invention is highly effective in radio devices that are driven by batteries and measuring devices a plurality of which are used.

Additionally, the above-mentioned constituent elements of the present invention may be combined and used in a desirable manner.

DETAILED DESCRIPTION

First Embodiment

Figure 7:
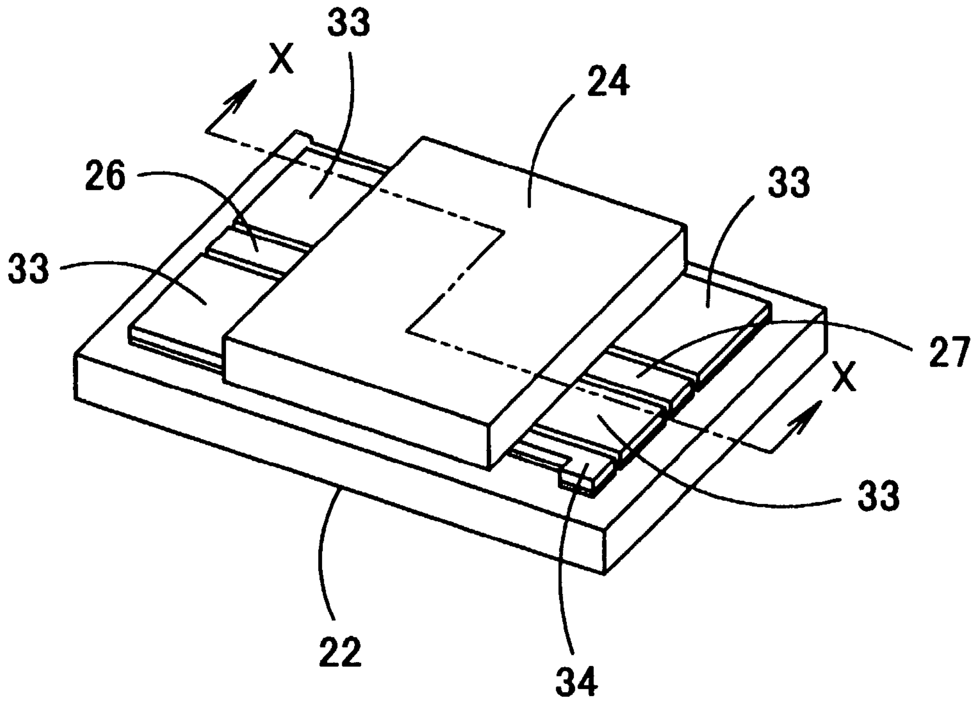
FIG. 7 shows a perspective view of an electrostatic actuator in accordance with one embodiment of the present invention.
Figure 8:
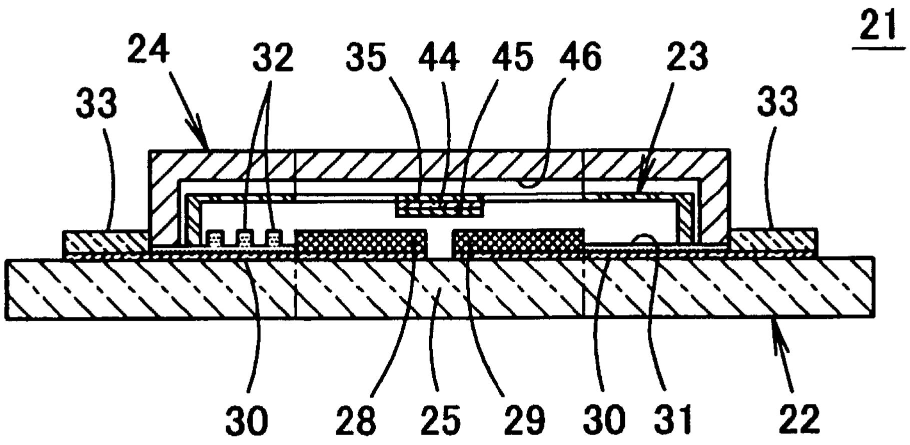
FIG. 8 shows a cross-sectional view taken along line X—X of FIG. 7.
Figure 9:
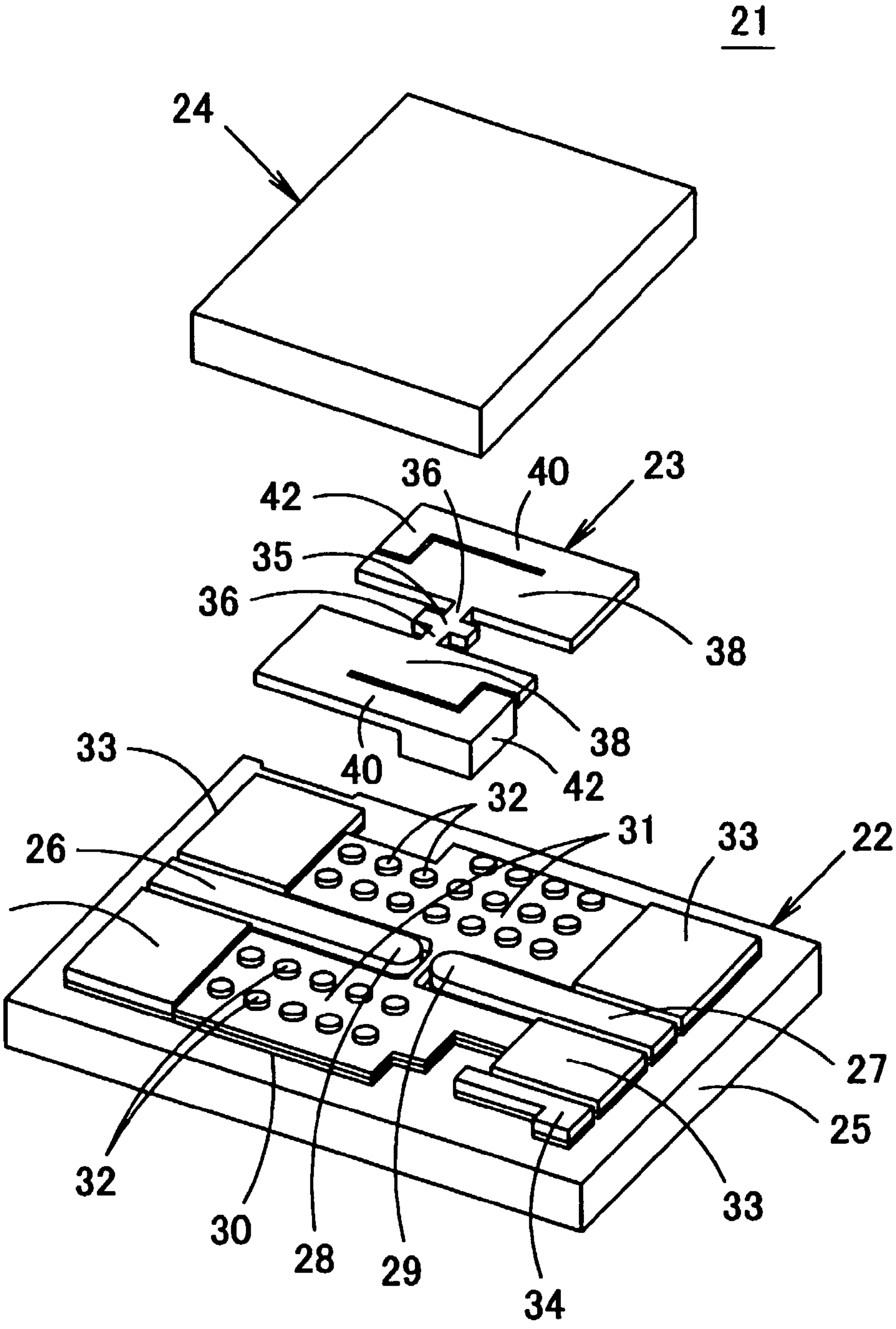
FIG. 9 shows an exploded perspective view that indicates a structure of the electrostatic actuator of FIG. 7.

FIG. 7 shows a perspective view of an electrostatic actuator in accordance with one embodiment of the present invention, FIG. 8 shows a cross-sectional view taken along line X—X and FIG. 9 shows an exploded perspective view that shows a structure of the electrostatic actuator. This electrostatic actuator 21 comprises a micro-machined relay manufactured by using a micro-machining technique, and includes a fixed substrate 22, a movable substrate 23 and a cap 24.

In the fixed substrate 22, two signal lines 26, 27 are formed on a substrate 25 (which may be a glass substrate or the like) by using a metal film, and ends of the respective signal lines 26, 27 are aligned face to face with each other with a small gap in between so that respective ends of the signal lines 26, 27 form fixed contacts 28, 29 on the center portion of the upper face of the substrate 25. Moreover, fixed electrodes 30 are placed on both of the right and left sides of each signal line 26, 27, and the fixed electrodes 30 on both of the sides are connected to each other through a gap between the fixed contacts 28, 29. The surface of each of the fixed electrodes 30 is coated with an insulating film 31. Moreover, a plurality of fine protrusions 32 are formed on the upper surface of the insulating film 31. Fixed electrode pads 33, which are respectively conductive to the fixed electrodes 30, are formed on both of the right and left sides of the end of each signal line 26, 27. Moreover, a movable electrode pad 34 is placed on one of the corner portions of the upper surface of the substrate 25. Here, the size of the protrusions 32 is set to several 100 to several 1000 angstroms; however, in FIG. 9, for convenience of explanation, both of the diameter and protrusion height of the protrusion 32 are depicted in an enlarged manner in comparison with the actual relative dimension.

The movable substrate 23 is made of Si and has conductivity, and movable electrodes 38 are formed on both sides of a movable contact area 35 formed virtually in the center thereof through elastic supporting portions 36, and anchors 42 are formed on the respective movable electrodes 38 through elastic bending portions 40. Moreover, a movable contact 45, made of a conductive material such as metal, is formed on the lower surface of the movable contact area 35 from an insulating layer 44 made of an oxide film ($SiO_2$) and a nitride film (SiN). The movable substrate 23 is elastically supported above the fixed substrate 22 by securing the anchor 42 onto the fixed substrate 22 by an anode joining process or the like; thus, the movable electrode 38 is aligned face to face with the fixed electrode 30 through the insulating film 31, with the movable contact 45 facing both of the fixed contacts 28, 29 in a manner so as to bridge over these. The movable substrate 23 is secured onto the upper surface of the fixed substrate 22 so that it is electrically connected to the movable electrode pad 34.

The cap 24, which is made of glass or the like, has a lower surface on which a recessed section 46 is formed. The cap 24 is put on the fixed substrate 22 over the movable substrate 23 that is joined to the upper surface of the fixed substrate 22, and joined to the upper surface of the fixed substrate 22 by using a sealing material such as low-melting-point glass in a manner so as to surround the peripheral portion of the lower surface. Consequently, the movable substrate 23, the fixed contacts 28, 29, the fixed electrode 30, etc. are sealed in the recessed section 46 of the cap 24 in an air-tight manner.

Figure 10:
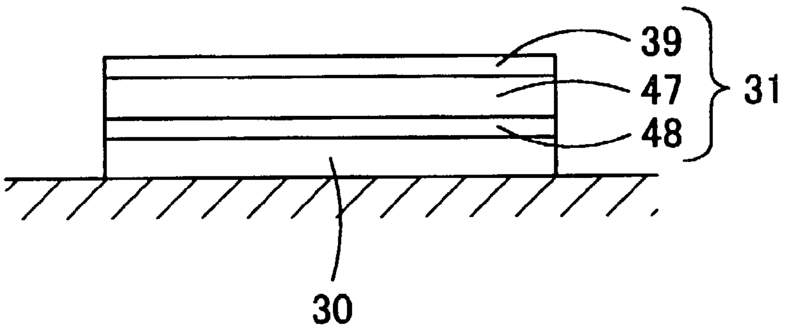
FIG. 10 shows a schematic cross-sectional view that indicates a structure of an insulating film formed on a fixed electrode in the electrostatic actuator of FIG. 7.

FIG. 10 shows a structure of the insulating film 31 that is used for preventing short-circuiting between the fixed electrode 30 and the movable electrode 38. The insulating film 31 has a multi-layer structure, and comprises an oxide film ($SiO_2$) 48, a nitride film (SiN) 47 and an oxide film ($SiO_2$) 39 placed in this order from the electrode side. In this insulating film 31, the film thickness of the oxide film 48 closest to the electrode is preferably made thinner so that the charge quantity due to ions is minimized as small as possible, with the thickness of the nitride film 47 that is hardly chargeable being set to a comparatively great value, so that proper properties such as voltage resistant property are maintained, and the nitride film 47 is covered with the oxide film 39 so that processing properties upon forming the insulating film 31 are properly maintained.

In the electrostatic actuator 21 having the above-mentioned arrangement, a driving voltage Vdrive, which is higher than an on-voltage, is applied between the fixed electrode 30 and the movable electrode 38 so that an electrostatic force is generated. When the movable electrode 38 is attracted by the electrostatic force between the two electrodes, the elastic bending portion 40 of the movable substrate 23 is distorted to allow the movable electrode 38 to shift toward the fixed electrode 30 side. When the movable electrode 38 has shifted toward the fixed electrode 30 side, the movable contact 45 is first allowed to contact the fixed contacts 28, 29 to close the fixed contacts 28, 29; thus, the two signal lines 26, 27 are electrically conducted to each other. After the movable contact 45 comes into contact with the fixed contacts 28, 29, the movable electrode 38 is further attracted to the fixed electrode 30, and allowed to adhere to the fixed electrode 30 with the insulating film 31 being interpolated in between. With this arrangement, the movable contact 45 is made in press-contact with the fixed contacts 28, 29 through an elastic force by the elastic supporting portion 36. Moreover, when the driving voltage Vdrive is removed to eliminate the electrostatic force so that the movable electrode 38 is returned to its original shape through an elastic force to be separated from the fixed electrode 30 with the movable contact 45 being substantially simultaneously separated from the fixed contacts 28, 29; thus, the signal lines 26 and 27 are electrically disconnected. When the fixed contacts 28, 29 are opened, the contact opening force is increased by the elastic force of the elastic supporting portion 36 so that the fixed contacts 28 and 29 are immediately disconnected.

Figure 11:
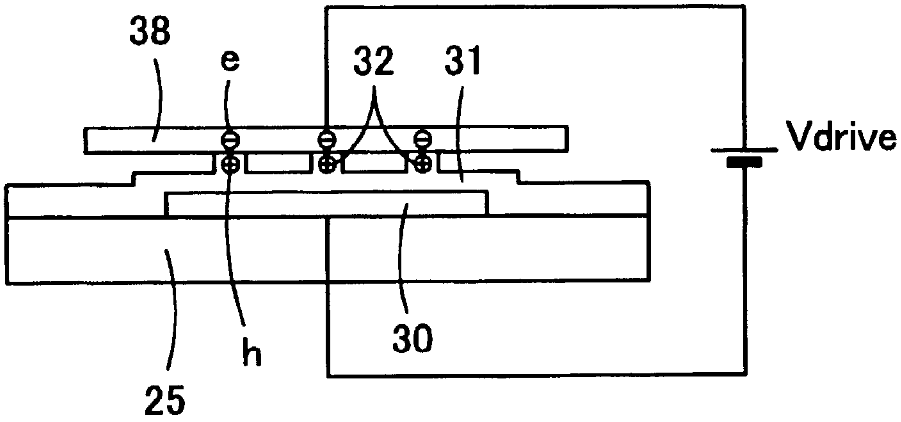
FIG. 11 shows a schematic drawing that indicates a principle which suppresses the plus shift by forming a protrusion on the insulating film.

In this electrostatic actuator 21, the fine protrusions 32 are formed on the surface of the insulating film 31 so that, when the electrostatic actuator 21 is driven and the movable electrode 38 is allowed to adhere to the fixed electrode 30 through the insulating film 31, the movable electrode 38 and the insulating film 31 are not allowed to contact each other over the entire faces thereof, but only allowed to contact each other at the protrusions 32. As described earlier, since the plus shift is caused by a charge transfer exerted between the movable electrode 38 and the insulating film 31, the area of the protrusions 32 formed on the insulating film 31 is allowed to change the quantity of positive charge due to the charge transfer as shown in FIG. 11. Therefore, the total area of the protrusions 32 (the number of the protrusions 32 and the individual areas thereof) is adjusted so that the charge quantity between the movable electrode 38 and the insulating film 31 is controlled and the degree of the plus shift is adjusted. For example, the charge transfer is reduced by making the contact area between the insulating film 31 and the movable electrode 38 through the protrusions 32 smaller so that it is possible to reduce the occurrence of the charging due to the plus shift.

Figure 12:
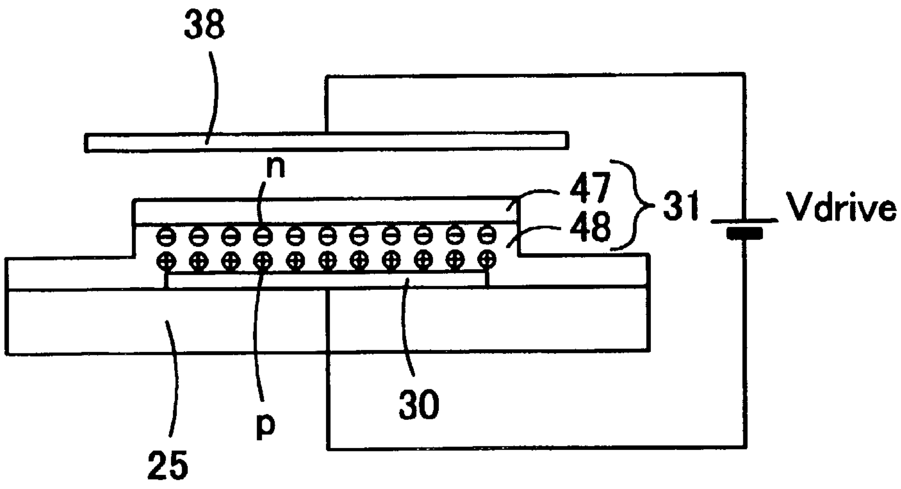
FIG. 12 shows a schematic drawing that indicates a principle which suppresses the minus shift by forming a nitride film in the insulating film.

Since the minus shift is caused by a biased state of ions inside the oxide film 48 as described above, it is possible to control the minus shift by adjusting the thickness of the oxide film 48. In particular, it is possible to reduce the charge quantity due to the minus shift by reducing the thickness of the oxide film 48. However, when the oxide film 48 (the insulating film 31) is made thinner, the voltage proof between the movable electrode 38 and the fixed electrode 30 is lowered. Therefore, in this electrostatic actuator 21, a layer of a nitride film 47 that hardly transmits ions is formed in the insulating film 31, and as shown in FIG. 12, by making the oxide film 48 thinner in a corresponding manner, the biased states of cations p and anions n are alleviated with the voltage proof property being maintained in the same manner to suppress the minus shift.

Therefore, in accordance with this electrostatic actuator 21, it is possible to control the plus shift and the minus shift, to improve the CV characteristic of the electrostatic actuator 21, and consequently to control the charging phenomenon due to the plus shift and minus shift and the like. As a result, for example, in the case of an electrostatic relay or the like, it is possible to control operational voltage characteristics such as on-voltage and off-voltage, and consequently to reduce variations thereof. However, neither the control of the plus shift by the use of the protrusions 32 nor the control of the minus shift by the use of the thickness of the oxide film 48 intend to reduce the charge quantity of the insulating film 31 due to the plus shift or the charge quantity of the insulating film 31 due to the minus shift. In other words, even in the case when neither the charge quantity due to the plus shift nor the charge quantity due to the minus shift is reduced, by controlling at least one of the plus shift and the minus shift, the charge quantity due to the plus shift and the charge quantity due to the minus shift are allowed to cancel each other to be set to zero; thus, as a whole, the charge quantity in the insulating film 31 is set to zero. More specifically, the plus shift is determined by using the sum of the contact areas of the protrusions 32 and the movable electrode 38 as a main factor so that the plus shift is controlled by adjusting the number and the contact areas of the protrusions 32, and the minus shift is determined by the total film thickness of the insulating film 31, and in particular, the film thickness of the oxide film 48 closest to the electrode forms a main factor so that the minus shift is controlled by adjusting the film thickness of the oxide film 48. Therefore, the plus shift is controlled by the protrusions 32, the minus shift is adjusted by the thickness of the oxide film 48, and the charge quantity due to the plus shift and the charge quantity due to the minus shift are allowed to cancel each other to set the sum of the two factors to zero. Alternatively, the electrical potential difference caused by the charge of the plus shift may be arranged to cancel the electrical potential difference caused by the charge of the minus shift. In the case when it is difficult to directly execute these methods, provision may be made so that, in the CV characteristic after the thermal endurance test, the shift toward the plus side and the shift toward the minus side are set to cancel each other so as to eliminate the shift of the center value of the CV characteristic.

Figure 13:
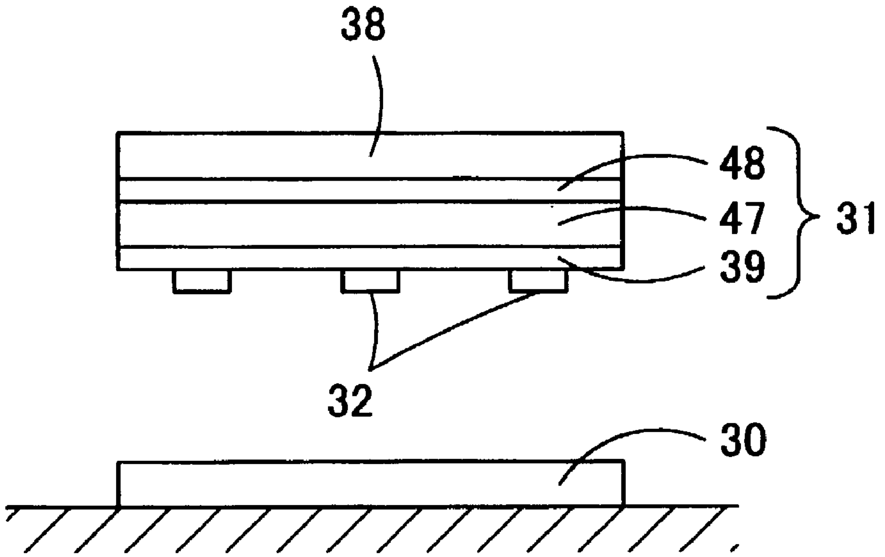
FIG. 13 shows a schematic cross-sectional view that indicates an electrostatic actuator having another structure in accordance with the present invention.
Figure 14:
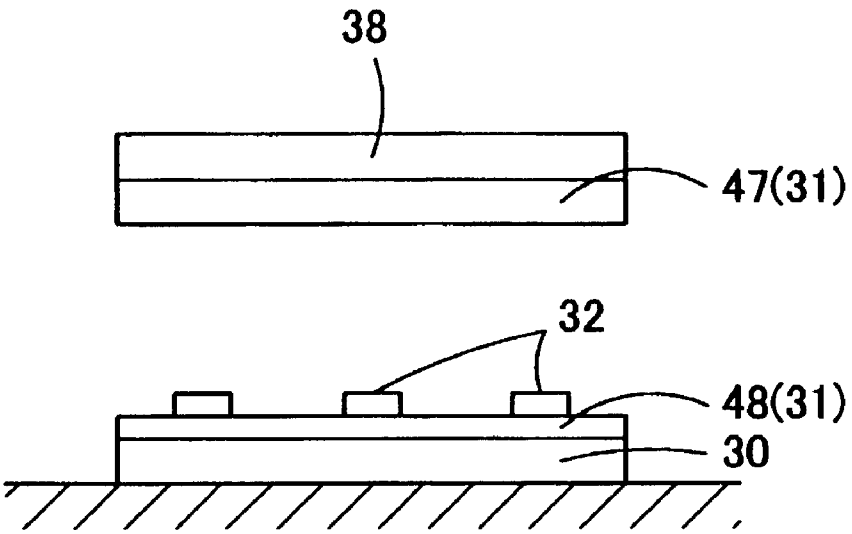
FIG. 14 shows a schematic cross-sectional view that indicates an electrostatic actuator having still another structure in accordance with the present invention.
Figure 15:
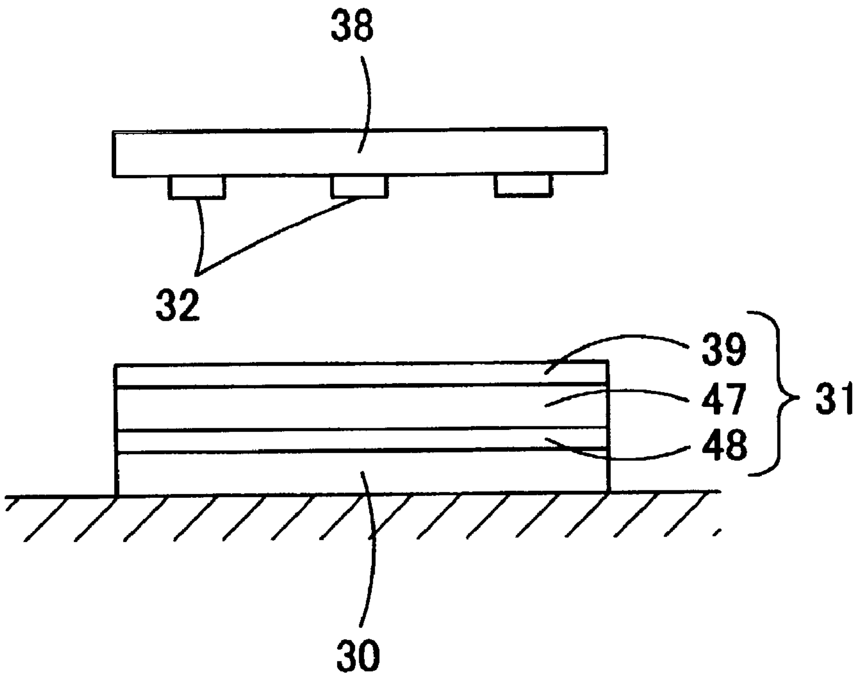
FIG. 15 shows a schematic cross-sectional view that indicates an electrostatic actuator having still another structure in accordance with the present invention.

In the above-mentioned embodiment, the insulating film 31 is formed on the fixed electrode 30; however, as shown in FIG. 13, the insulating film 31 may be formed on the movable electrode 38. Moreover, as shown in FIG. 14, the insulating films 31 may be formed on both of the fixed electrode 30 and the movable electrode 38 (for example, the nitride film 47 is formed on the movable electrode 38 with the oxide film 48 being formed on the fixed electrode 30); in this case, the protrusions 32 are formed on either one of them. Moreover, as shown in FIG. 15, the insulating film 31 and the protrusions 32 may be separated, and the insulating film 31 may be formed on one of the fixed electrode 30 and the movable electrode 38, with the protrusions 32 being formed on the other.

Second Embodiment

Here, depending on designs, it is assumed that there is an electrostatic actuator in which only either the plus shift or the minus shift occurs. For example, in the case of an electrostatic actuator having a contact area of zero (for example, the elasticity of the elastic bending portion is too high so that the movable electrode is not allowed to contact the fixed electrode and the insulating film. However, such an electrostatic actuator has problems that it needs to have a greater size, and that it needs a greater electrode size to compensate for the reduction in the driving force (torque) so as to obtain the same driving force, so no plus shift due to the charge transfer occurs.

In the case when only one of the shifts occurs, only either one of the charge-quantity control means, that is, either one of the protrusion 32 of the insulating film 31 and the oxide film 48 of the insulating film 31, may be used correspondingly. Therefore, the following description will discuss the means for controlling the plus shift and the means for controlling the minus shift in a separate manner, and with respect to means for controlling the minus shift, various modes of the insulating film 31 will be first explained.

Additionally, not limited to the electrostatic actuators as shown in FIGS. 7 to 9, the present invention can be widely applied as an electrostatic actuator in which the fixed electrode and the movable electrode are aligned face to face with each other with an insulating film interpolated in between. The electrostatic actuators, shown in FIGS. 7 to 9, have structures to be applied to electrostatic micro-relays, and in general, the electrostatic actuator of the present invention does not require the fixed contact and the movable contact. Although, in the following explanation, the explanation will be given by using the same reference numerals as those used in the electrostatic actuators of FIGS. 7 to 9, the subject of application is not intended to be limited to an electrostatic actuator shown in FIGS. 7 to 9, etc.

Figure 16:
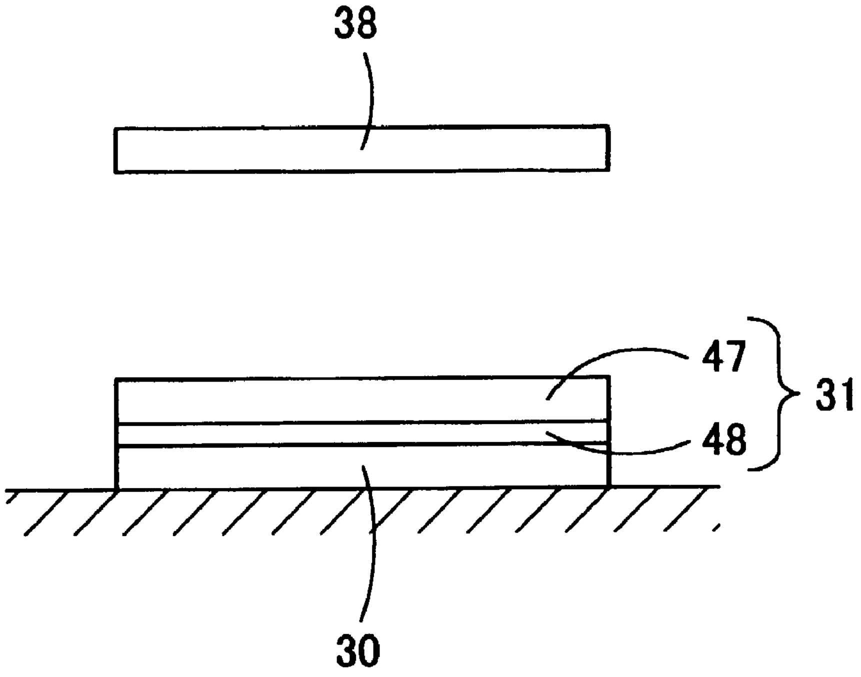
FIG. 16 shows a schematic cross-sectional view that indicates an electrostatic actuator having still another structure in accordance with the present invention.
Figure 17:
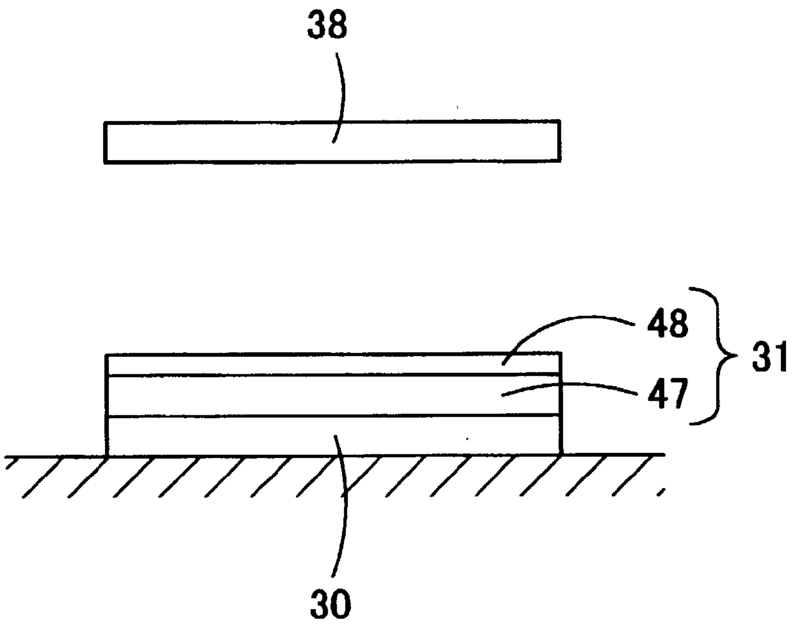
FIG. 17 shows a schematic cross-sectional view that indicates an electrostatic actuator having still another structure in accordance with the present invention.
Figure 18:
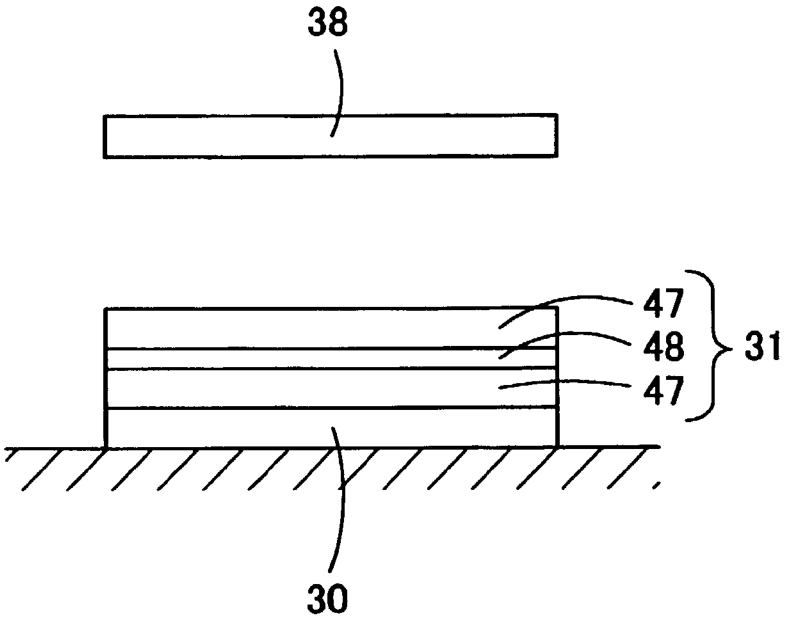
FIG. 18 shows a schematic cross-sectional view that indicates an electrostatic actuator having still another structure in accordance with the present invention.
Figure 19:
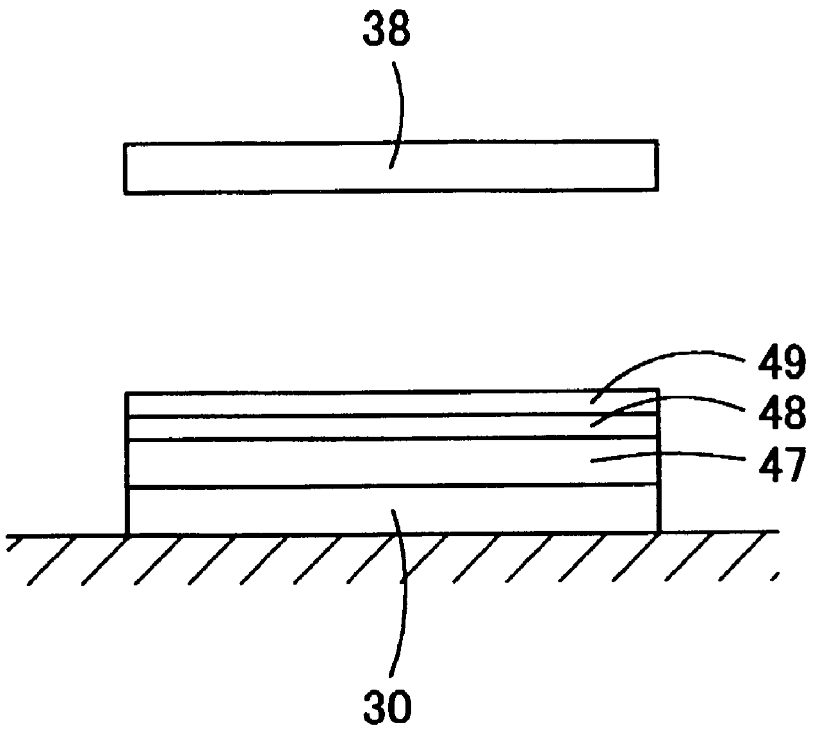
FIG. 19 shows a schematic cross-sectional view that indicates an electrostatic actuator having still another structure in accordance with the present invention.

In an electrostatic actuator shown in FIG. 16, an insulating film 31 is formed on the fixed electrode 30 by stacking an oxide film 48 and a nitride film 47 thereon from the lower surface side. Moreover, in the insulating film 31 shown in FIG. 17, a nitride film 47 and an oxide film 48 are stacked on the fixed electrode 30 from the lower surface side. In the insulating film 31 shown in FIG. 18, a nitride film 47, an oxide film 48 and a nitride film 47 are stacked on the fixed electrode 30 from the lower surface side. Moreover, as shown in FIG. 19, an oxide film 48 and a nitride film 47 may be stacked on the fixed electrode 30 in a desired order, and a third insulating film 49 other than the nitride film 47 and the oxide film 48 may be stacked thereon. Alternatively, although not shown in the Figure, an insulating film constituted by not less than four layers including a nitride film and an oxide film may be used.

When the oxide film and the nitride film are compared with respect to easiness of charging, the oxide film is charged not less than 100 times as easily as the nitride film. However, in the case when the contact area between the movable electrode 38 and the fixed electrode 30 is extremely small (for example, when the protrusion has a cone shape as shown in FIG. 27), the amount of plus shift becomes smaller. When an attempt is made to set the total charge quantity to zero, it is necessary to make the quantity of minus shift smaller, and one of the methods for this is to make the oxide film 48 thinner; however, the oxide film 48 is easily charged, with the result that, even when this is made thinner, imbalance between the charge quantity due to the plus shift and the charge quantity due to the minus shift tends to occur. In such a case, as described in embodiments shown in FIGS. 16 to 19, the nitride film 47, which is hardly charged, is placed closest to the electrode to control the charge quantity.

The explanation has exemplified a case in which the insulating film 31 is formed on the fixed electrode 30; however, this may of curse be formed on the movable electrode 38. Moreover, the first and second embodiments have exemplified an insulating film constituted by a nitride film and an oxide film; however, the material for the insulating film which is formed on the electrode is not limited to a nitride film and an oxide film. The charge quantity in the insulating film 31 is mainly determined by the film thickness of the oxide film 48, with the nitride film 47 being only used for maintaining a film thickness required for a proper voltage proof characteristic or the like; therefore, not limited to the nitride film 47 and the oxide film 48, any kind of material may be used as long as it has these functions.

However, the application of a combination of an oxide film ($SiO_2$) and a nitride film (SiN) makes it possible to obtain the effect of controlling the minus shift, to optimize the manufacturing technique, and consequently to easily manufacture an electrostatic actuator with high yield. In other words, the effect of the former film, that is, the controlling function of the minus shift, is achieved by controlling the film thickness of the oxide film 48 closest to the electrode side, and the film thickness of the insulating film 48 is made thinner so that it hardly contains ions. The characteristic of the latter film, that is, to provide a high yield, is obtained by compensating for the property of the nitride film 47, that is, difficulty in processing, by the use of the oxide film 39. Upon etching, the nitride film has problems with processing in that it has a low selectivity with respect to glass and silicon, and in that no effective wet-etchant is available; therefore, when all the portion of the insulating film 31 is made of a nitride film 47, over-etching occurs on the substrate 25 made of glass and other metal layers, and unnecessary damages are caused, resulting in degradation in the processing precision. One of the solutions of these is to provide a structure which makes it possible to prevent the nitride film 47 from directly contacting the glass and other metals; and with respect to such a buffering layer, an oxide film 39, which is easily processed and has necessary dielectric constant and insulating property, is used to coat the surface of the nitride film 47.

Third Embodiment

Next, with respect to a means for controlling the plus shift, various modes of the protrusions 32 will be explained. The protrusions 32 may be formed on the same side as the insulating film 31 of the fixed electrode 30 and the movable electrode 38, or may be formed on the opposite side thereof. Here, in the case when the protrusions 32 are formed on the same side as the insulating film 31, these may be formed integrally with the insulating film 31 or may be formed in a separate manner. The protrusions 32 may be formed by the same material as the constituent material of the insulating film 31, that is, for example, an oxide ($SiO_2$) and a nitride (SiN), or may be formed by a material different from the insulating film 31, for example, a metal. In particular, when the protrusions 32 are formed on the side different from the insulating film 31, for example, on the movable electrode 38, the protrusions 32 may be formed on the surface of the electrode (for example, the movable electrode 38) by an electrode material.

Figure 20:
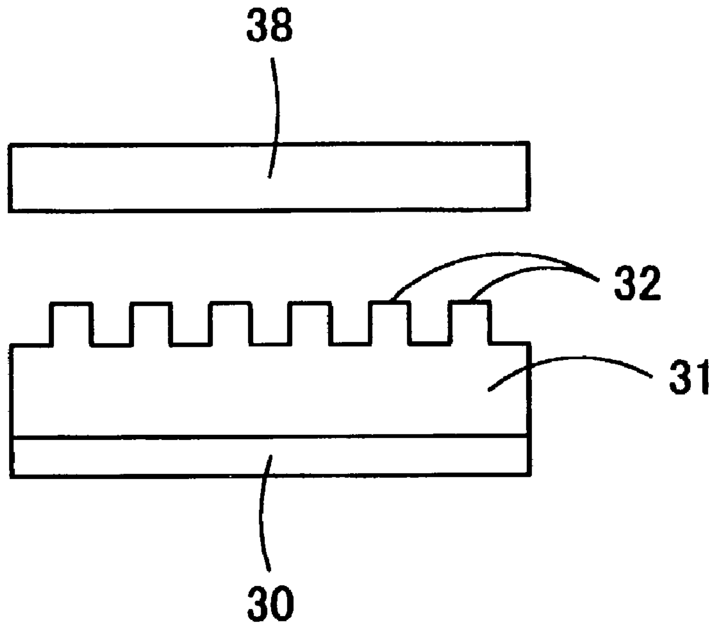
FIG. 20 shows a schematic cross-sectional view that indicates an electrostatic actuator having still another structure in accordance with the present invention.
Figure 21:
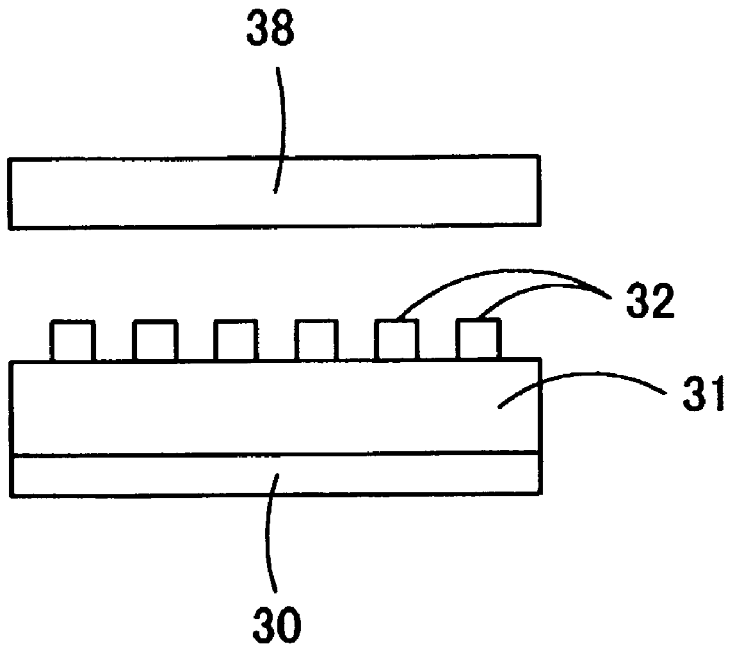
FIG. 21 shows a schematic cross-sectional view that indicates an electrostatic actuator having still another structure in accordance with the present invention.
Figure 22:
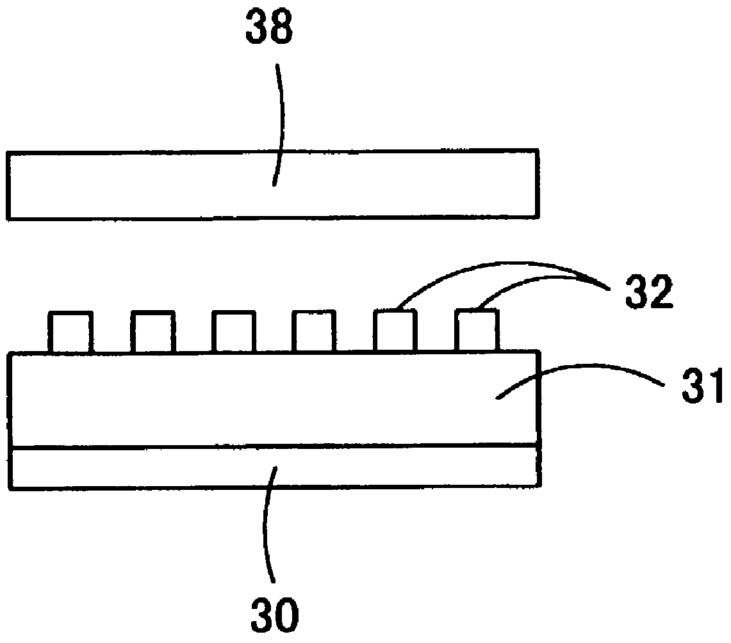
FIG. 22 shows a schematic cross-sectional view that indicates an electrostatic actuator having still another structure in accordance with the present invention.
Figure 23:
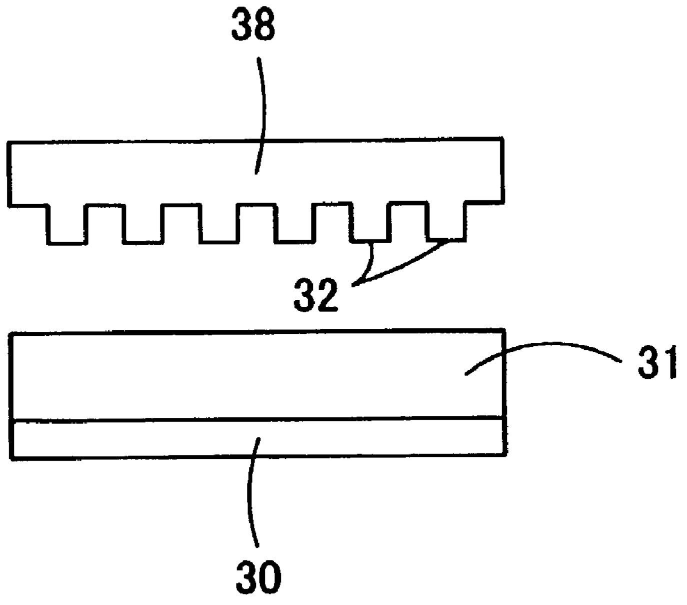
FIG. 23 shows a schematic cross-sectional view that indicates an electrostatic actuator having still another structure in accordance with the present invention.
Figure 24:
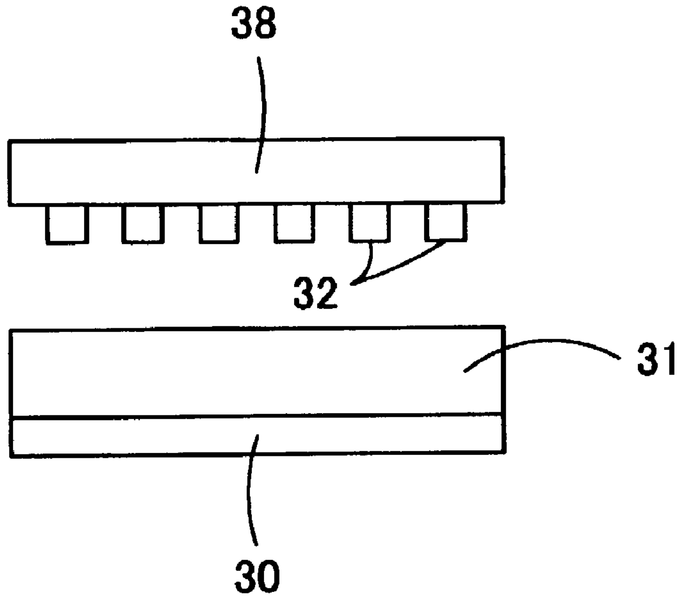
FIG. 24 shows a schematic cross-sectional view that indicates an electrostatic actuator having still another structure in accordance with the present invention.
Figure 25:
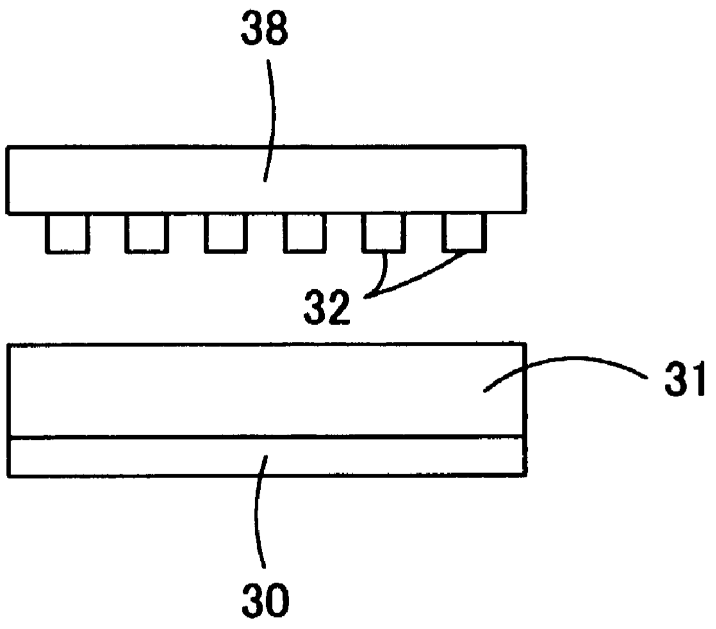
FIG. 25 shows a schematic cross-sectional view that indicates an electrostatic actuator having still another structure in accordance with the present invention.

More specifically, in an electrostatic actuator shown in FIG. 20, an insulating film 31 is formed on either one of the fixed electrode 30 and the movable electrode 38, and protrusions 32 are formed integrally with the insulating film 31 on the upper surface of the insulating film 31 by using the same material as the insulating film 31 (the uppermost layer). In a structure shown in FIG. 21, protrusions 32 are independently formed on the upper surface of the insulating film 31 by using an insulating material different from the insulating film 31 (the uppermost layer). In a structure shown in FIG. 22, protrusions 32 are formed on the upper surface of the insulating film 31 by using a conductive film. Moreover, in a structure shown in FIG. 23, an insulating film 31 is formed on either one of the fixed electrode 30 and the movable electrode 38, and protrusions 32 are formed on an opposite face of the other electrode integrally with the corresponding electrode by the same material as the corresponding electrode. In a structure shown in FIG. 24, protrusions 32 are formed on an opposite face of an electrode different from the electrode on which an insulating film 31 has been formed, that is, either one of the fixed electrode 30 and the movable electrode 38, by using an insulating material. In a structure shown in FIG. 25, protrusions 32 are formed on an opposite face of an electrode different from the electrode on which an insulating film 31 has been formed, that is, either one of the fixed electrode 30 and the movable electrode 38, by using a conductive material that is different from the material of the electrode. Additionally, in FIGS. 20 to 25, the insulating film 31 is located on the fixed electrode side; however, the insulating film 31 may be located on the movable electrode side, with the fixed electrode 30 and the movable electrode 38 being replaced by each other.

Figure 26A:
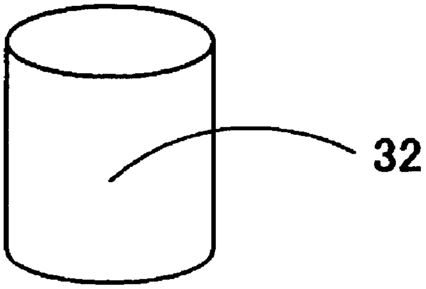
FIG. 26A shows a perspective view that indicates a protrusion having a cylinder shape.
Figure 26B:
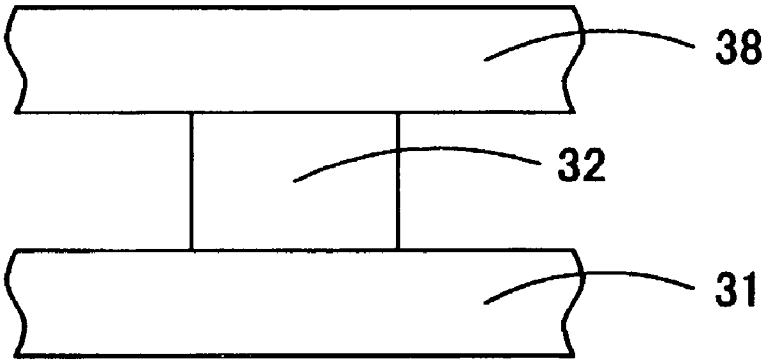
FIG. 26B shows a schematic drawing that explains a state in which the protrusion occupies a space between the insulating film and the movable electrode.
Figure 27A:
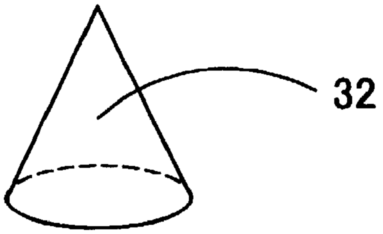
FIG. 27A shows a perspective view that indicates a protrusion having a cone shape.
Figure 27B:
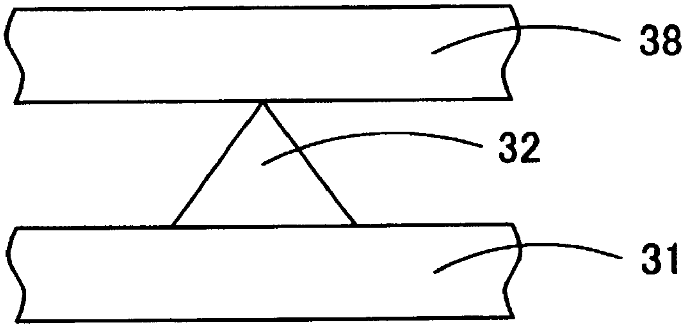
FIG. 27B shows a schematic drawing that explains a state in which the protrusion occupies a space between the insulating film and the movable electrode.
Figure 28A:
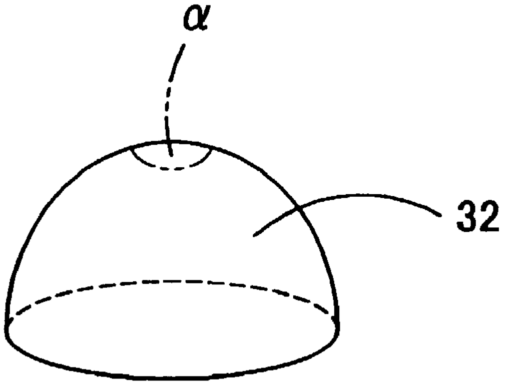
FIG. 28A shows a perspective view that indicates a protrusion having a spherical shape.
Figure 28B:
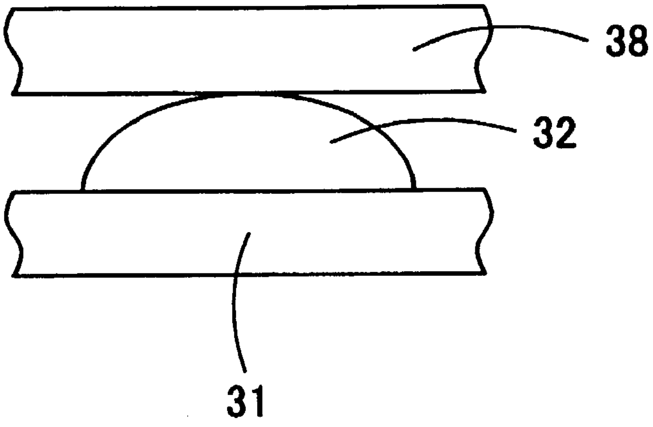
FIG. 28B shows a schematic drawing that explains a state in which the protrusion occupies a space between the insulating film and the movable electrode.
Figure 29A:
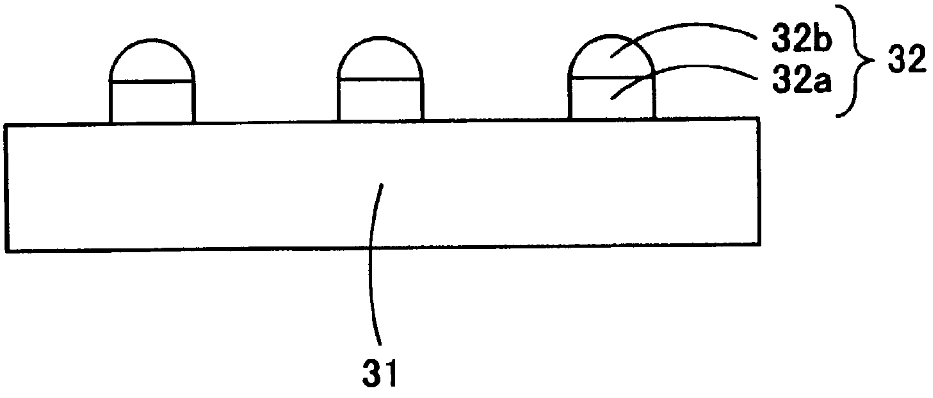
FIGS. 29A and 29B show schematic cross-sectional views that respectively indicate modified examples of the protrusion having a spherical shape.
Figure 29B:
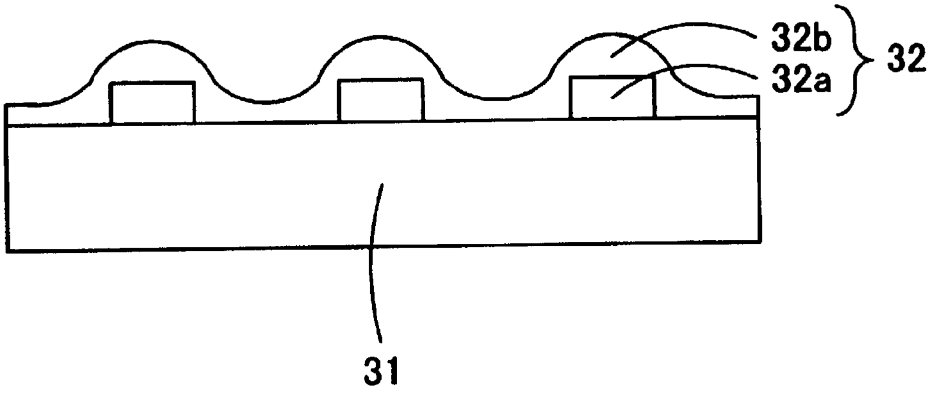

Next, the following description will discuss the shape of the protrusions 32. FIG. 26A shows a cylinder-shaped protrusion 32, FIG. 27A shows a cone-shaped protrusion 32, and FIG. 28A shows a protrusion 32 whose surface has a spherical shape. In the case of the cylinder-shaped protrusion 32 of FIG. 26A, the space filling rate between the electrodes is high as shown in FIG. 26B; however, this causes a greater contact area to the movable electrode 38, resulting in a reduction in the suppressing effect of the plus shift. Moreover, in the case of the cone-shaped protrusion 32 shown in FIG. 27A, although the contact area to the movable electrode 38 is small as shown in FIG. 27B, the space filling rate between the electrodes becomes lower. The low space filling rate causes degradation in the attracting force of the movable electrode 38 in the electrostatic actuator. In contrast, in the case of the protrusion 32 whose surface has a spherical face as shown in FIG. 28A, its contact area is a fine area a formed by its apex as shown in FIG. 28B, and the space filling rate between the electrodes is great, thereby forming an optimal protrusion 32. Moreover, each of structures, shown in FIG. 29A, 29B, is a modified example of the protrusion 32 having a spherical shape. In other words, in the structure of FIG. 29A, a column-shaped base post 32*a* is formed on the insulating film 31, and an uncured protrusion material is dropped thereon to form a curved portion 32*b* having a spherical shape by utilizing surface tension; thus, a protrusion 32 is formed by the base post 32*a* and the curved portion 32*b*. Moreover, in the structure of FIG. 29B, a column-shaped base post 32*a* is formed on the insulating film 31, and a protrusion material is deposited on the insulating film 31 over this structure by sputtering or the like to form a curved portion 32*b*; thus, a protrusion 32 is formed by the base post 32*a* and the curved portion 32*b*. These modified examples make it possible to increase the space filling rate.

Figure 30A:
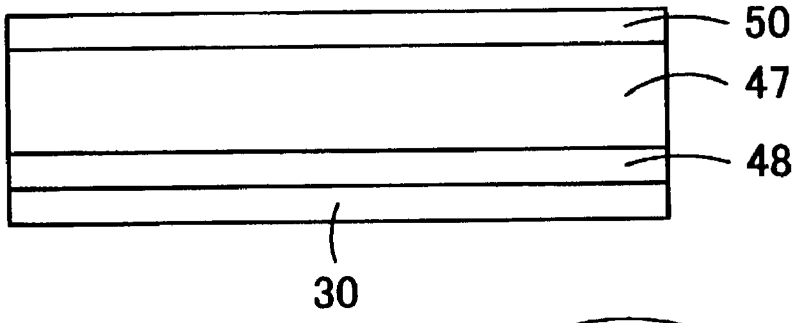
FIGS. 30A, 30B and 30C show cross-sectional views that explain a method for forming the protrusion having the structure shown in FIG. 29B.
Figure 30B:
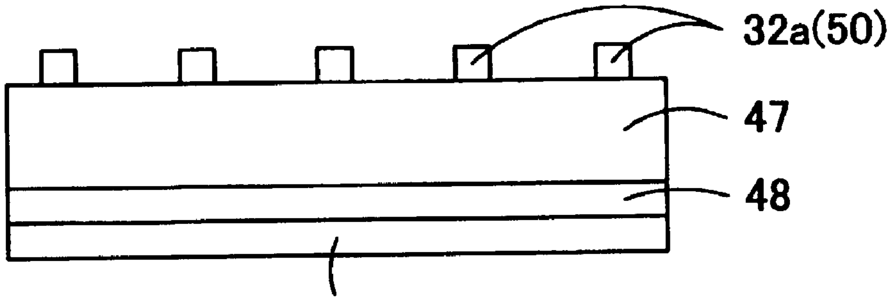
Figure 30C:
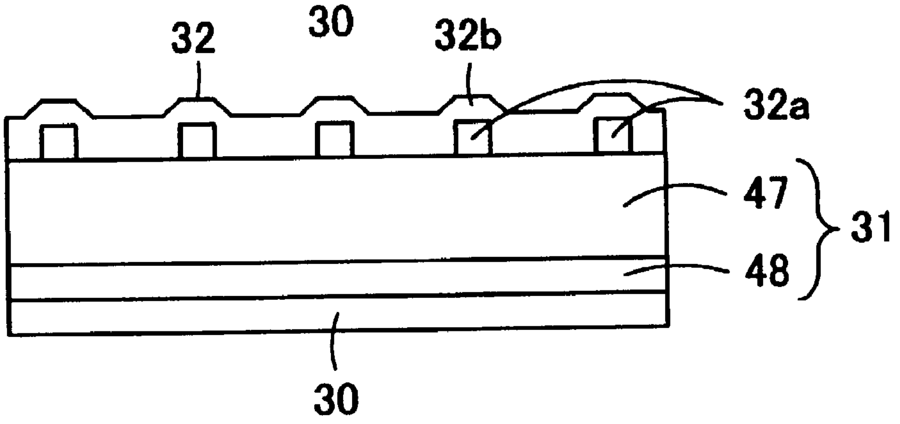

FIGS. 30A, 30B, 30C are cross-sectional views that explain a manufacturing method of the structure shown in FIG. 29B. In this manufacturing method, an oxide film 48 is formed on a fixed electrode 30 by a primary sputtering process, a nitride film 47 is formed thereon, and an oxide film 50 is further formed thereon (FIG. 30A). Then, the upper oxide film 50 is processed by etching or the like so that a plurality of base posts 32*a* having a column shape are formed on the nitride film 47 (FIG. 30B). Thereafter, an oxide film is deposited on the upper surface of the nitride film 47 over the base posts 32*a* to form curved portions 32*b*; thus, the surface of each curved portion 32*b* becomes close to a spherical shape at each base post 32*a* so that the structure shown in FIG. 29B is achieved.

Figure 31A:
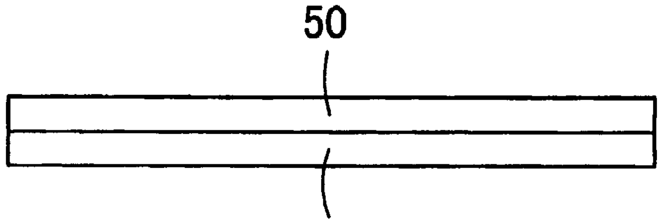
FIGS. 31A, 31B and 31C show cross-sectional views that explain a method for forming a protrusion having a structure similar to the structure shown in FIG. 29B.
Figure 31B:
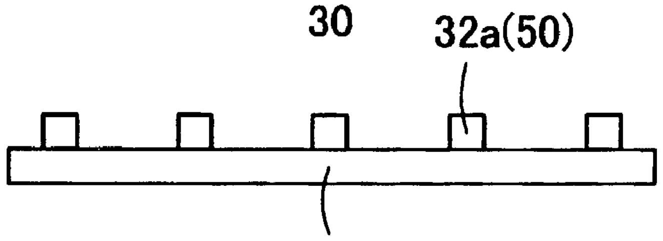
Figure 31C:
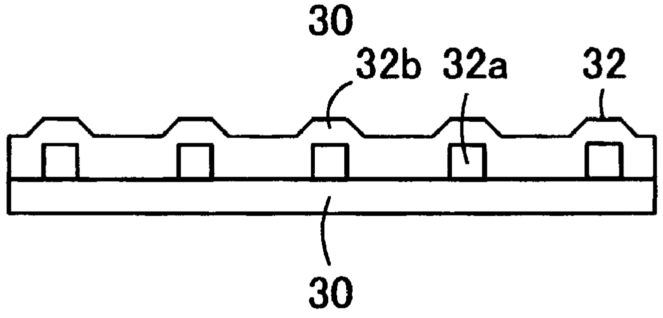

Moreover, FIGS. 31A, 31B and 31C are cross-sectional views that explain a manufacturing method of a structure that is similar to the structure shown in FIG. 29B. In this manufacturing method, an oxide film 50 is formed on the fixed electrode 30 by a primary sputtering process (FIG. 31A). Next, the oxide film 50 is processed by etching, etc. so that a plurality of base posts 32*a* having a column shape are formed on the fixed electrode 30 (FIG. 31B). Thereafter, an oxide film is deposited on the upper surface of the fixed electrode 30 over the base posts 32*a* by a secondary sputtering process to form a curved portion 32*b*; thus, the surface of each curved portion 32*b* has a virtually spherical shape at a portion of each base post 32*a* to achieve a structure similar to the structure of FIG. 29B. Neither each protrusion 32, formed by each base post 32*a* and the oxide film (curved portion 32*b*) on the upper surface thereof as described in FIGS. 31A, 31B and 31C, nor the oxide film between the base posts 32*a* is formed on the insulating film 31 so that each base post 32*a* and the oxide film itself also have functions as the insulating film 31.

Figure 32:
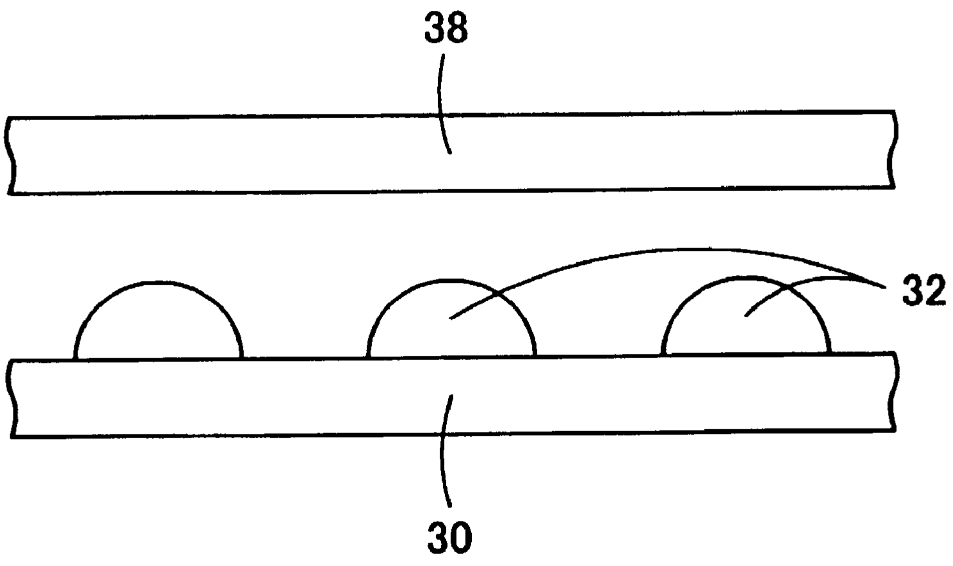
FIG. 32 shows a side view that indicates an electrostatic actuator having another structure in accordance with the present invention.
Figure 33:
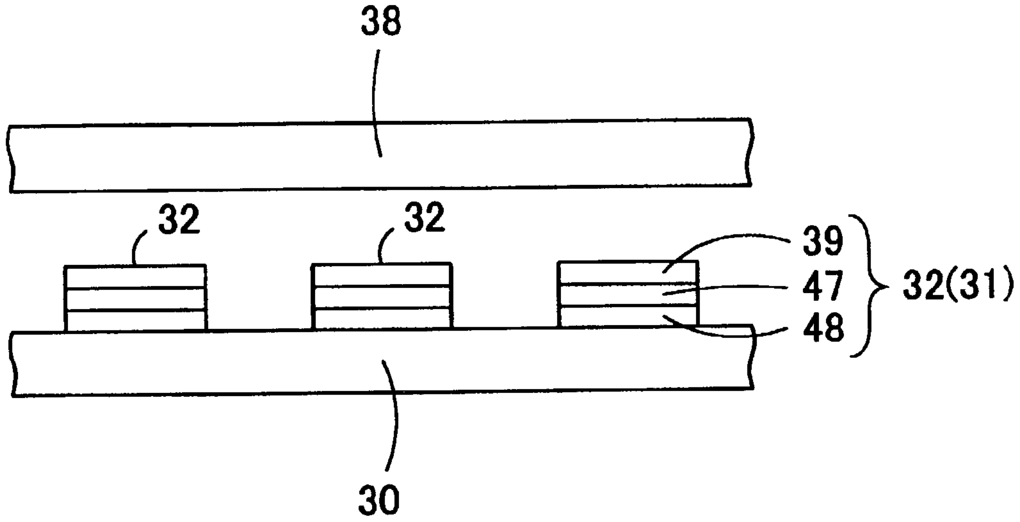
FIG. 33 shows a side view that indicates an electrostatic actuator having still another structure in accordance with the present invention.

In the structures shown in FIGS. 32, 33, each protrusion 32 itself forms the insulating film 31. In other words, the protrusions 32 shown in FIG. 32 are formed on the fixed electrodes 30 by using an insulating material such as an oxide so that each protrusion 32 also serves as the insulating film 31. Moreover, each protrusion 32 shown in FIG. 33 is formed by stacking the oxide film 48, the nitride film 47 and the oxide film 39 on the fixed electrode 30 so that each protrusion 32 is also allowed to serve as the insulating film 31.

In the second and third embodiments, the insulating film 31 and the protrusion 32 are explained in a separate manner, and in the case when the protrusions 32 are formed simultaneously as the nitride film 47 is formed on the insulating film 31, the structures of the insulating film and the structures of the protrusions, as described above (including those not described above), may be desirably combined.

Moreover, the insulating film 31 containing the nitride film 47, as described in the second embodiment, and the protrusions 32, as described in the third embodiment, may be respectively used in an independent manner. In other words, in the case of an electrostatic actuator having a structure for preventing the plus shift, the film thickness of the oxide film 48 may be made thinner so as to reduce the minus shift. Moreover, even in the case when the plus shift and the minus shift are caused, the film thickness of the oxide film 48 is made thinner so as to control only the charge quantity caused by the minus shift, and the charge quantity of the plus shift that is not controlled is cancelled by using the charge quantity due to the controlled minus shift; thus, the charge quantity as a whole is set to zero. In this case, by using the nitride film 47 that is hardly charged, the film thickness of the insulating film 31 as a whole may be controlled. In the same manner, in the case of an electrostatic actuator having a structure for preventing the minus shift, the plus shift may be reduced by forming the protrusion 32. Moreover, even in the case when the plus shift and the minus shift are caused, only the charge quantity due to the plus shift is controlled by the contact area of the protrusion 32 so that the charge quantity of the minus shift that is not controlled is cancelled by using the charge quantity due to the controlled plus shift; thus, the charge quantity as a whole is set to zero.

Figure 34:
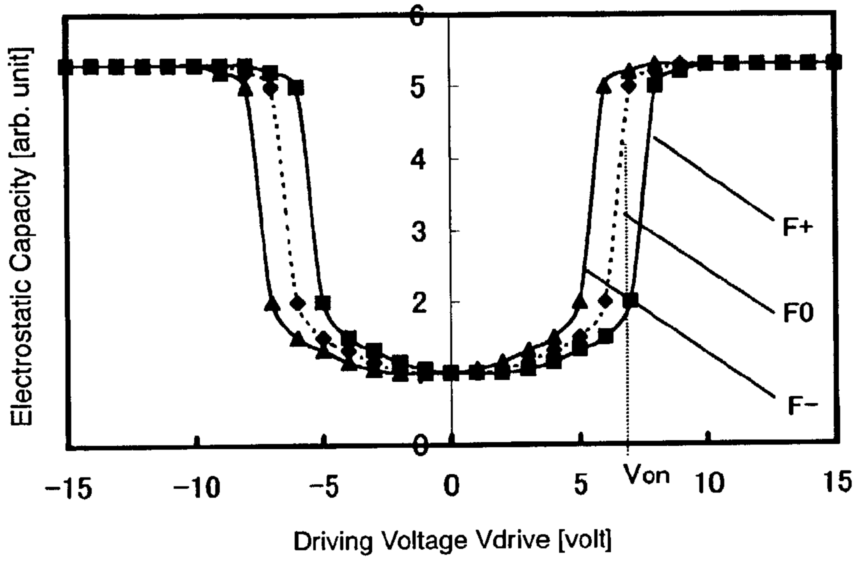
FIG. 34 shows a drawing that indicates a change in the CV characteristic before and after a thermal endurance test carried out on an electrostatic actuator having protrusions on an insulating film.
Figure 35:
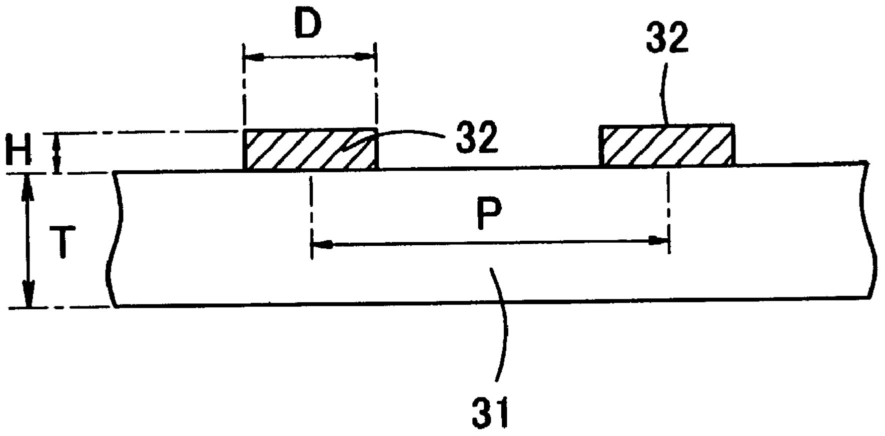
FIG. 35 shows a drawing that explains an electrostatic actuator that has been subjected to the test of FIG. 34.

FIG. 34 shows a drawing that indicates a change in the CV characteristic before and after the thermal endurance test of an electrostatic actuator so as to confirm the effects of the protrusions 32. In other words, as shown in FIG. 35, an insulating film 31 made of an oxide film ($SiO_2$) is formed on the fixed electrode, with the protrusion 32 made of an oxide film ($SiO_2$) being formed on the insulating film 31 in the same manner, so that an electrostatic actuator is formed. Here, the thickness T of the insulating film 31 is set to 2000 to 2500 angstroms, the height H of each protrusion 32 is set to 400 to 600 angstroms, the diameter D of each protrusion 32 is set to 25 to 35 μm, and a plurality of protrusions 32 are formed with pitches P set to 100 to 110 μm. With a driving voltage of the rated voltage being applied between the fixed electrode and the movable electrode of the electrostatic actuator that forms this measuring subject, this has been held at 85° C. for 1000 hours, and this is then left at a standard state for two hours. The CV characteristic is measured with respect to the electrostatic actuator having been subjected to such a thermal endurance test, and FIG. 34 shows the results of the measurements.

Figure 1:
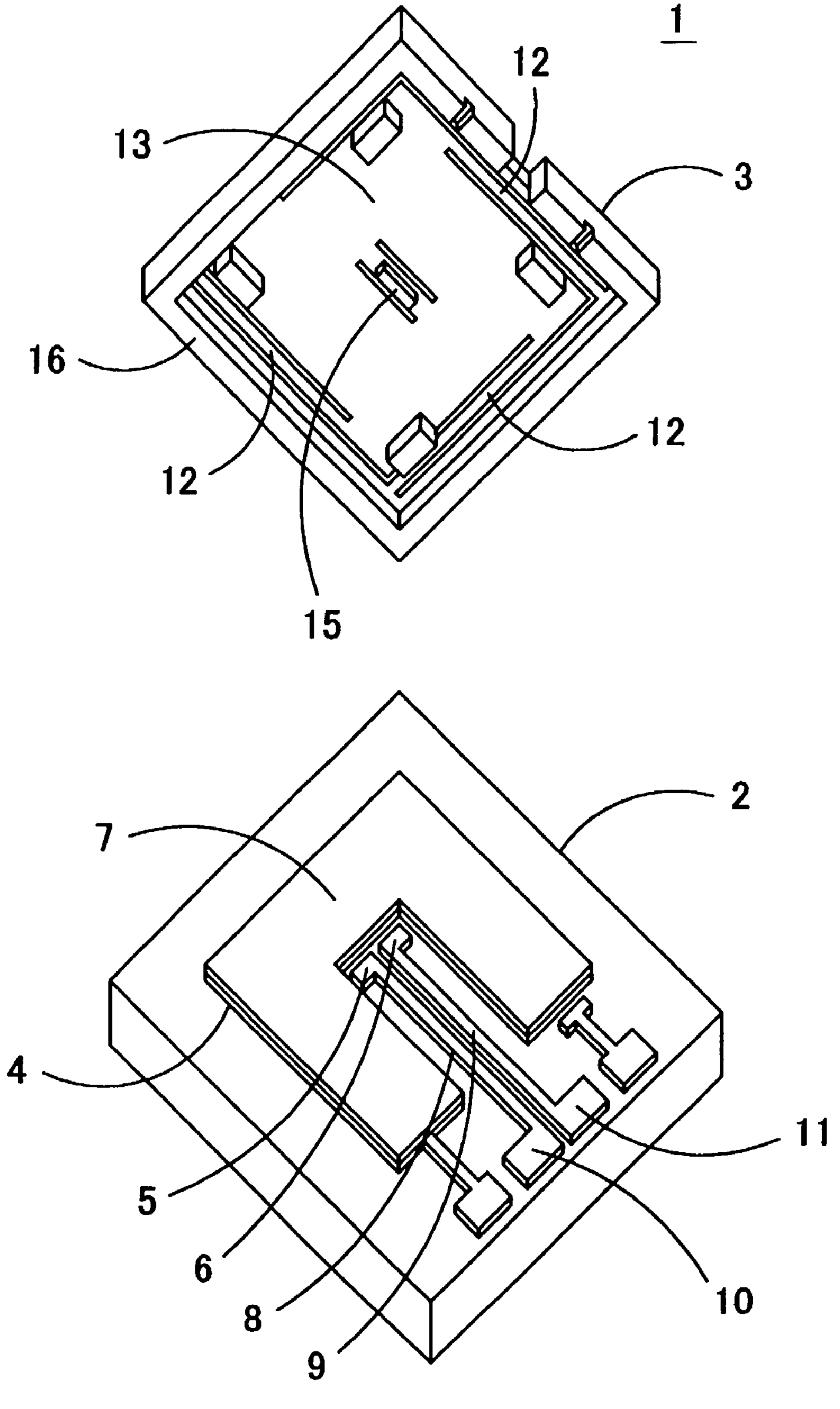
FIG. 1 shows an exploded perspective view that indicates a structure of a conventional electrostatic actuator.
Figure 2:
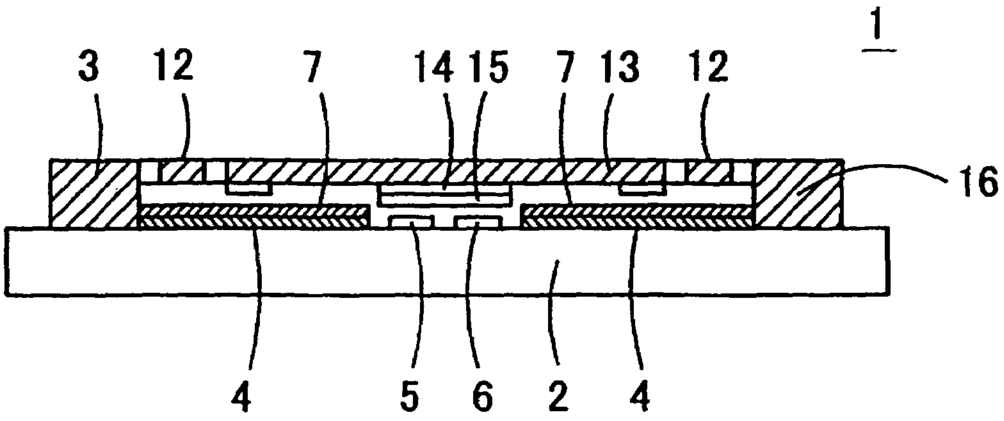
FIG. 2 shows a cross-sectional view of the conventional electrostatic actuator.
Figure 3:
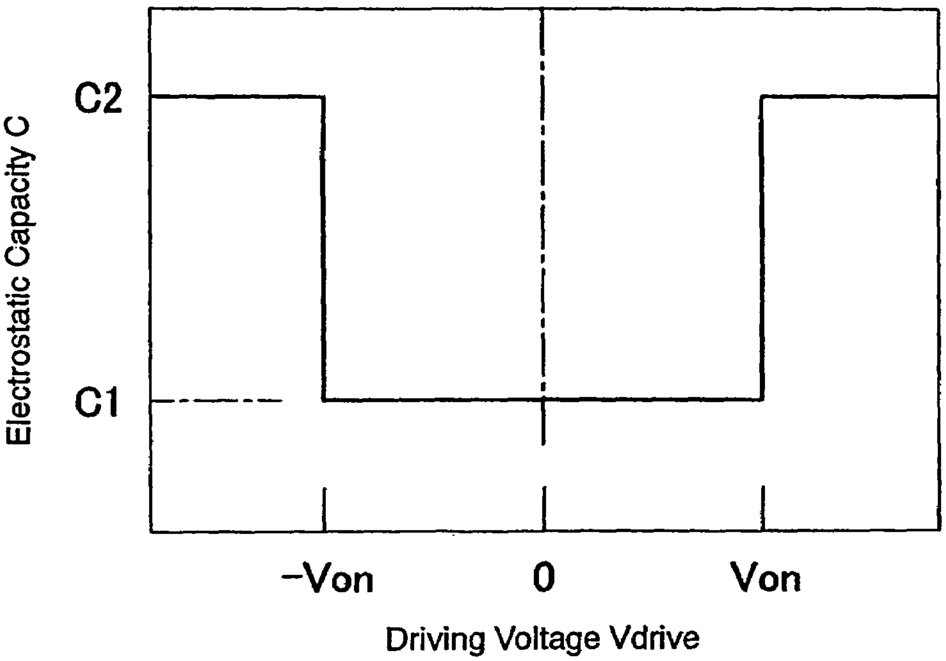
PRIOR ART Fig. 3
FIG. 3 shows a drawing that indicates a CV characteristic of an optimal electrostatic actuator.
Figure 4:
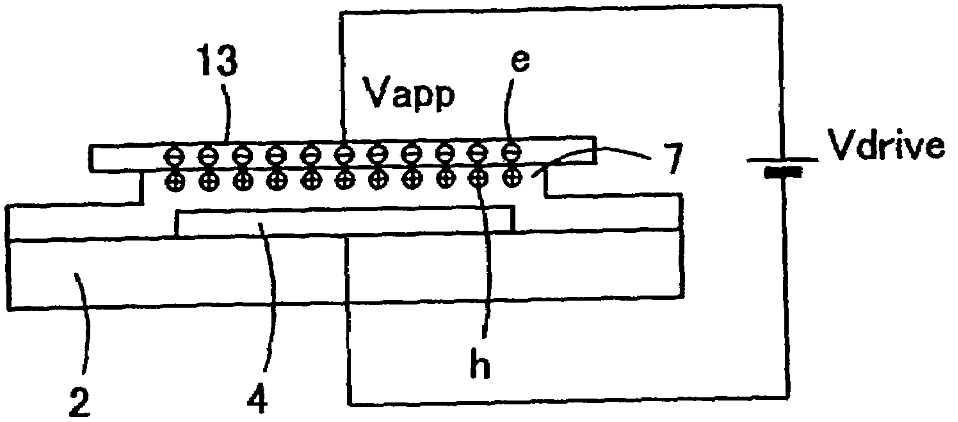
FIG. 4 shows a schematic drawing that explains a state in which a plus-shift charge is generated between a movable electrode and an insulating film.
Figure 5:
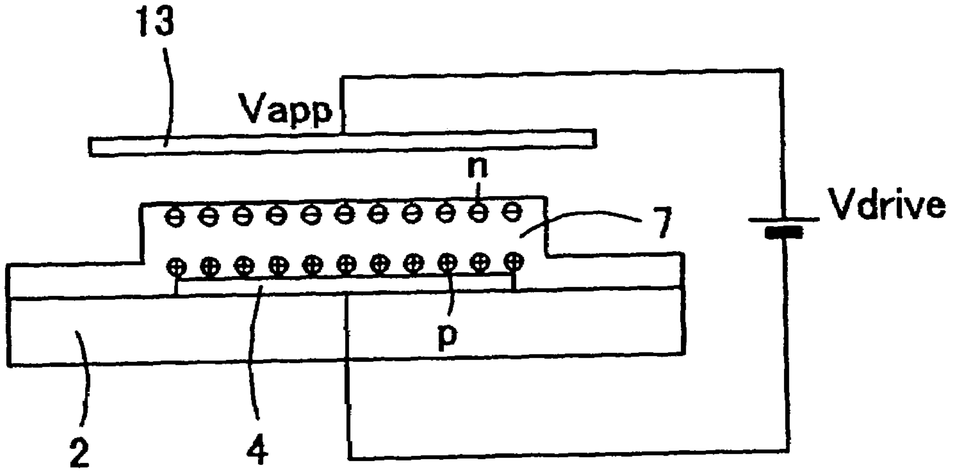
Prior Art Fig. 5
FIG. 5 shows a schematic drawing that indicates a state in which a minus-shift charge is generated in an insulating film.
Figure 6:
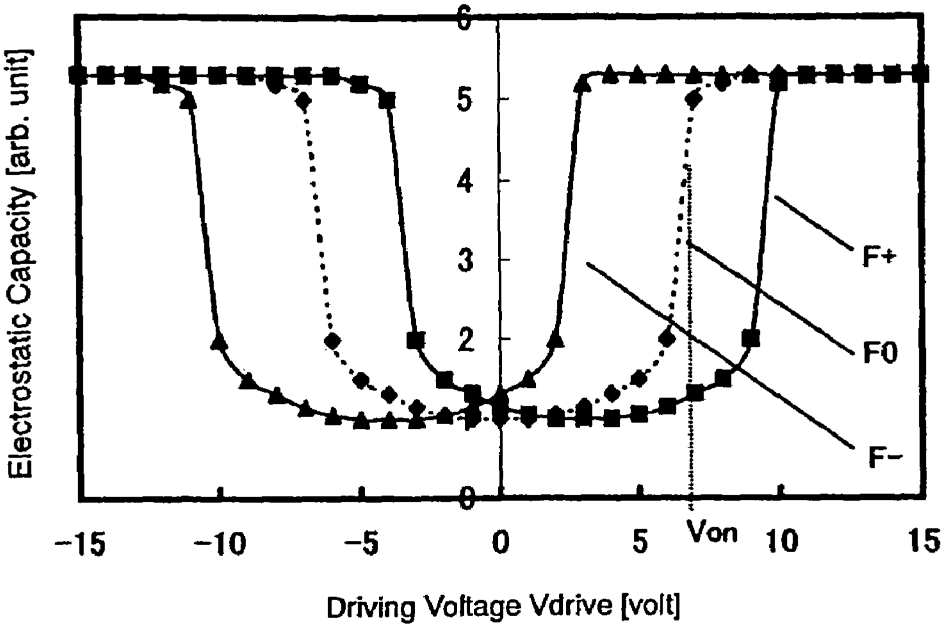
FIG. 6 shows a drawing that indicates a change in the CV characteristic before and after a thermal endurance test.

In FIG. 34, those indicated by broken lines and rhomboidal shape points represent an initial CV characteristic F0 of an electrostatic actuator. Moreover, among the CV characteristics indicated by solid lines in FIG. 34, the characteristic F+ indicated by solid lines and square points represents the CV characteristic of the electrostatic actuator having the plus shift, and the characteristic F− indicated by solid lines and triangular points represents the CV characteristic of the electrostatic actuator having the minus shift. When the CV characteristic of FIG. 34 is compared with the CV characteristic shown in FIG. 6, the shift amounts of F+ and F− in the CV characteristic of FIG. 34 become extremely small, thereby clearly indicating the effects of the formation of the protrusions.

Fourth Embodiment

Figure 36:
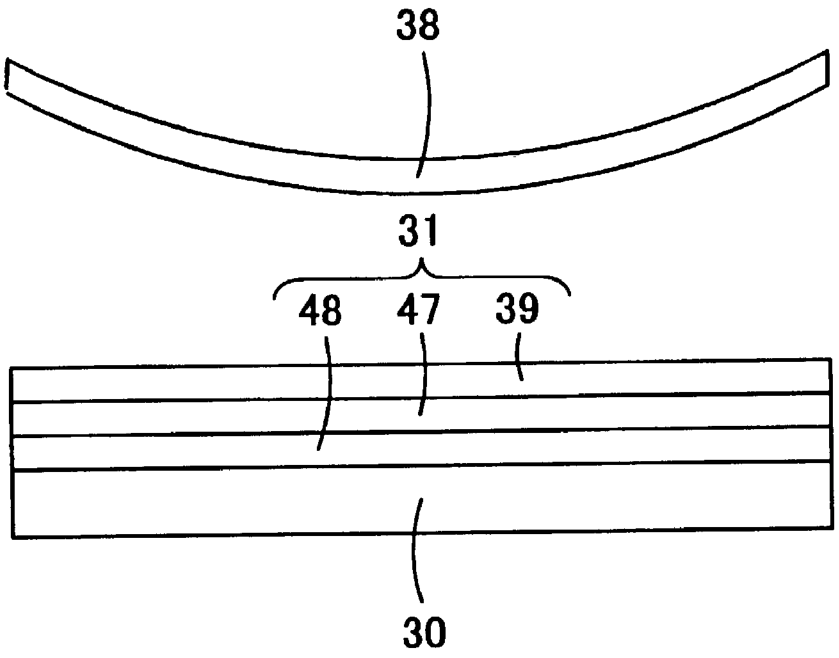
FIG. 36 shows a schematic cross-sectional view that indicates a structure of an electrostatic actuator relating to still another embodiment of the present invention.
Figure 37:
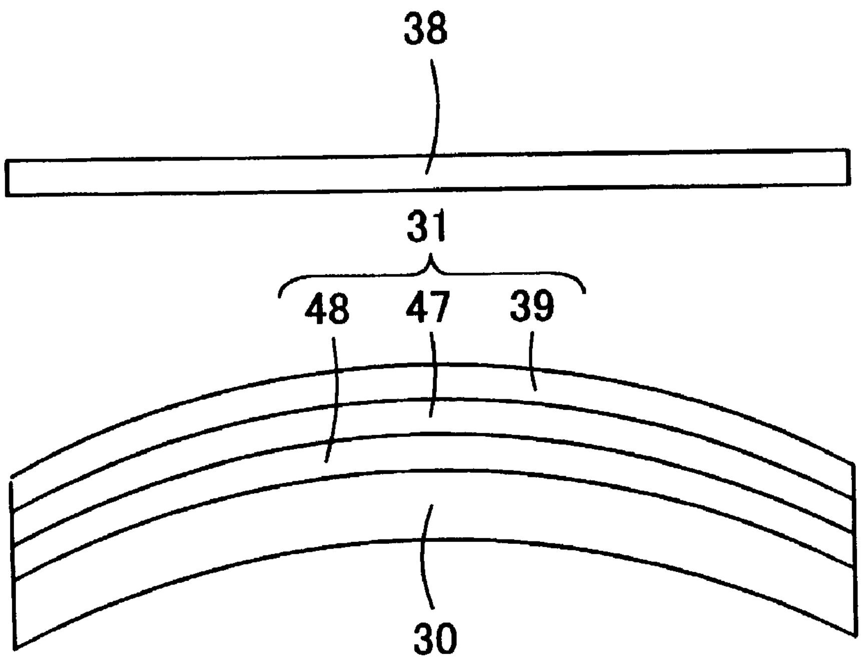
FIG. 37 shows a schematic cross-sectional view that indicates a structure of an electrostatic actuator relating to still another embodiment of the present invention.

FIGS. 36 and 37 show portions of the fixed electrode 30 and the movable electrode 38 of an electrostatic actuator in accordance with still another embodiment of the present invention. In this embodiment, at least one electrode of the fixed electrode 30 and the movable electrode 38 is curved so that the contact area of the insulating film 31 and the electrode is made smaller to suppress the plus shift.

First, FIG. 36 will be explained. In this Figure, an insulating film 31 including a nitride film 47 is formed on a flat fixed electrode 30, and the movable electrode 38 is curved into a groove shape or a spherical shape so as to make the center portion stick toward the fixed electrode 30 side. In this embodiment, since the movable electrode 38 is curved, the contact area of the movable electrode 38 and the insulating film 31 is made smaller so that the plus shift is suppressed, and the film thickness of the oxide film 48 is made thinner so that the minus shift is also suppressed. In the same manner, in an embodiment shown in FIG. 37, the fixed electrode 30 is curved into a groove shape or a spherical shape so as to stick toward the movable electrode 38 side, and an insulating film 31 including a nitride film 47 is formed on the fixed electrode 30. In this embodiment, since the fixed electrode 30 and the insulating film 31 are curved, with the result that the contact area of the movable electrode 38 and the insulating film 31 is made smaller so that the plus shift is suppressed, and the film thickness of the oxide film 48 is made thinner so that the minus shift is suppressed.

Moreover, different from the embodiment of FIG. 36 in which the movable electrode 38 has been preliminarily curved, for example, the movable electrode 38, supported at both of the ends, may be attracted toward the fixed electrode side, and elastically distorted into a groove shape or a spherical shape. Alternatively, although not shown in the Figures, the movable electrode 38, which is supported in a cantilever fashion, may be attracted toward the fixed electrode 30 side so that the movable electrode 38 is diagonally tilted so that the movable electrode 38 is made in contact with the fixed electrode 30 or the insulating film 31 with a small contact area.

Fifth Embodiment

Figure 38:
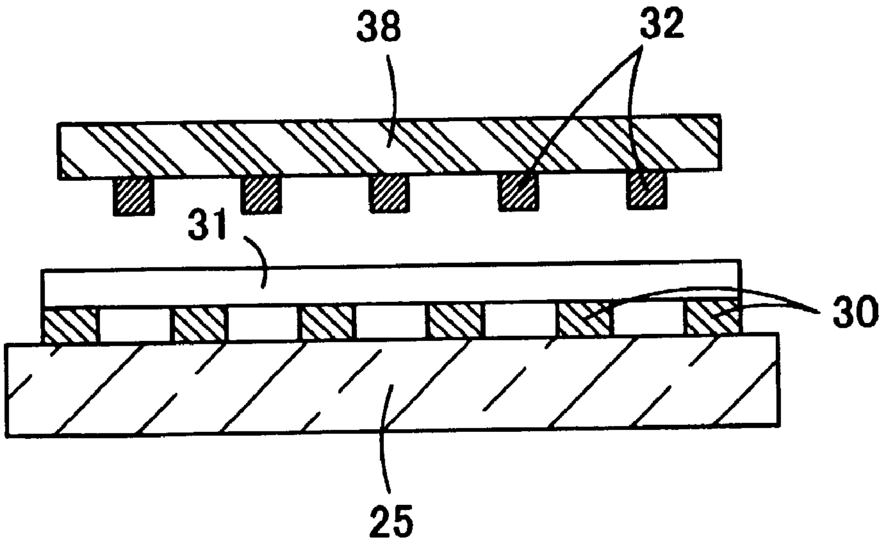
FIG. 38 shows a schematic cross-sectional view that indicates a structure of an electrostatic actuator relating to still another embodiment of the present invention.

FIG. 38 is a cross-sectional view that shows the structure of an electrostatic actuator in still another embodiment of the present invention. In this electrostatic actuator, a plurality of post-shaped or line-shaped fixed electrodes 30 that are separated with intervals from each other are formed on the upper surface of a substrate 25 made of a glass substrate or the like, and an insulating film 31 is formed on the upper surface of the fixed electrodes 30 in a manner so as to cover the entire fixed electrodes 30. Moreover, a plurality of post-shaped or line-shaped protrusions 32 are formed on the lower face of the movable electrode 38 in a manner so as not to face the fixed electrodes 30. Here, either of the fixed electrodes 30 and the protrusions 32 may be formed into a lattice shape or a net shape as long as the fixed electrodes 30 and the protrusions 32 are made face to face with each other without overlapping each other.

In such an embodiment, an electric field, exerted between the fixed electrode 30 and the movable electrode 38 is only limited to a portion at which the fixed electrode 30 is formed; therefore, the contact portion between the electrodes, that is, a portion at which each protrusion 32 and the insulating film 31 are made in contact with each other is less susceptible to a great electric field. Therefore, this structure makes it possible to reduce the occurrence of charging due to charge transfer, and consequently to reduce the charge quantity of the plus shift due to charge transfer.

Figure 39:
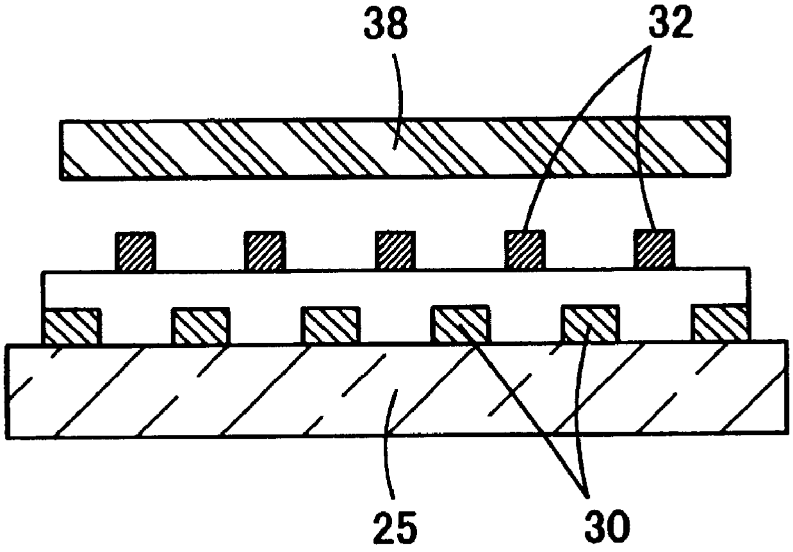
FIG. 39 shows a schematic cross-sectional view that indicates a structure of an electrostatic actuator relating to still another embodiment of the present invention.

FIG. 39 is a cross-sectional view that shows a structure of an electrostatic actuator in accordance with still another embodiment of the present invention. In this electrostatic actuator, a plurality of post-shaped or line-shaped fixed electrodes 30 that are separated with intervals from each other are formed on the upper surface of a substrate 25 made of a glass substrate or the like, and the upper surface of the substrate 25 is coated with an insulating film 31 in a manner so as to cover the fixed electrodes 30. Moreover, a plurality of post-shaped or line-shaped protrusions 32 are formed on the upper surface of the insulating film 31 in a manner so as not to face the fixed electrodes 30. Here, either of the fixed electrodes 30 and the protrusions 32 may be formed into a lattice shape or a net shape as long as the fixed electrodes 30 and the protrusions 32 are made face to face with each other without overlapping each other.

In this embodiment also, an electric field, exerted between the fixed electrode 30 and the movable electrode 38, is only limited to a portion at which the fixed electrode 30 is formed; therefore, the contact portion between the electrodes, that is, a portion at which each protrusion 32 and the insulating film 31 are made in contact with each other is less susceptible to a great electric field. Therefore, this structure makes it possible to reduce the occurrence of charging due to charge transfer, and consequently to reduce the charge quantity of the plus shift due to charge transfer.

Moreover, in the embodiments of FIGS. 38 and 39, the fixed electrodes 30 are formed partially so as not to overlap the protrusions 32; however, the movable electrode 38 may be formed partially so as not to overlap the protrusion 32 (not shown).

Sixth Embodiment

Figure 40:
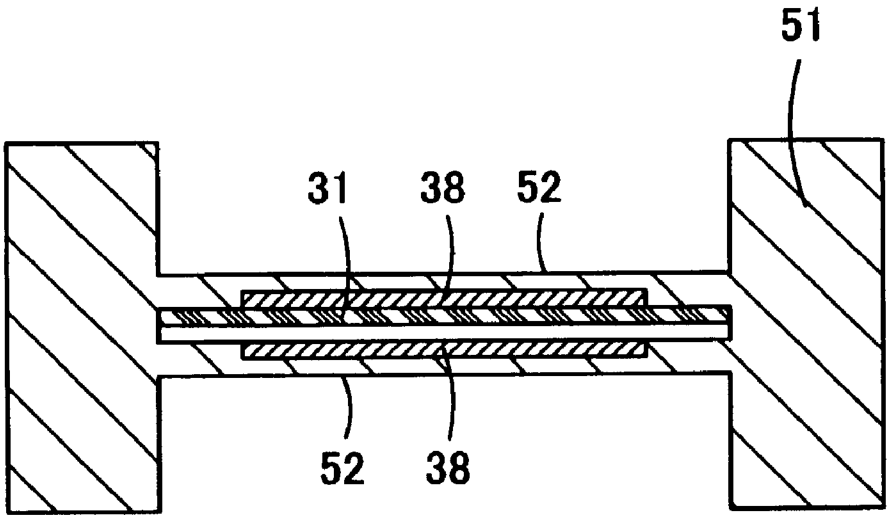
FIG. 40 shows a schematic cross-sectional view that indicates a structure of an electrostatic actuator relating to still another embodiment of the present invention.

FIG. 40 is a cross-sectional view that shows the structure of an electrostatic actuator in still another embodiment of the present invention. In this electrostatic actuator, two movable portions 52, each having a diaphragm shape, are supported by a frame 51 along the peripheral portion thereof, and movable electrodes 38 are respectively formed on the opposite faces of the two movable portions 52 so that the surface of at least one of the movable electrodes 38 is coated with an insulating film 31. This embodiment shows an example of an electrostatic actuator without any fixed electrode. Here, in this embodiment also, protrusions may be formed on the insulating film 31, or may be formed in a manner so as to face the insulating film 31.

Seventh Embodiment

Figure 41:
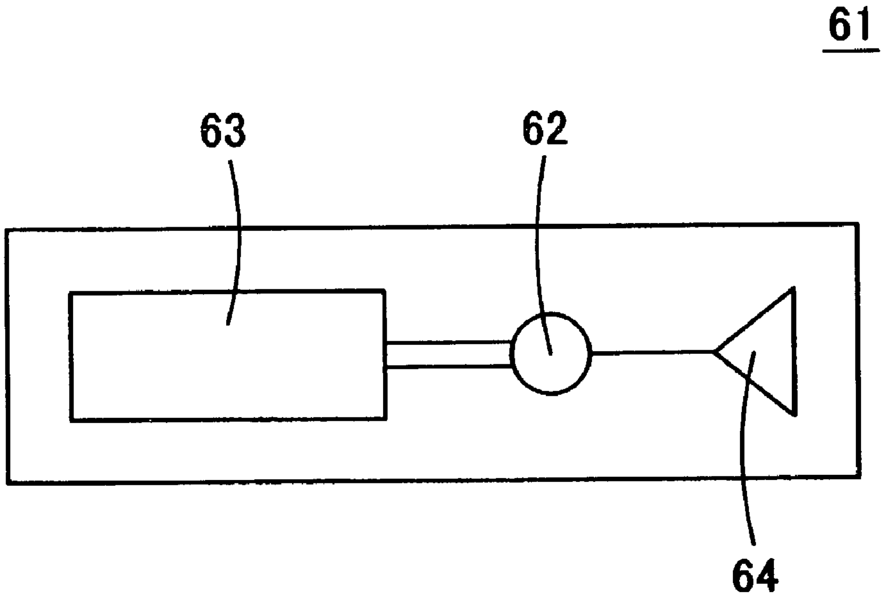
FIG. 41 shows a schematic drawing that indicates a radio device using an electrostatic micro-relay in accordance with the present invention.

The following description will discuss a device using electrostatic micro-relays having structures shown in FIGS. 7 to 9. FIG. 41 shows a schematic drawing that indicates a radio device 61 in which an electrostatic micro-relay 62 of the present invention is used. In this radio device 61, the electrostatic micro-relay 62 is connected between an inner circuit 63 and an antenna 64; thus, by carrying out on-off operations on the electrostatic micro-relay 62, the inner circuit 63 is switched between a transmittable or receivable state and an un-transmittable or un-receivable state through the antenna 64.

Figure 42:
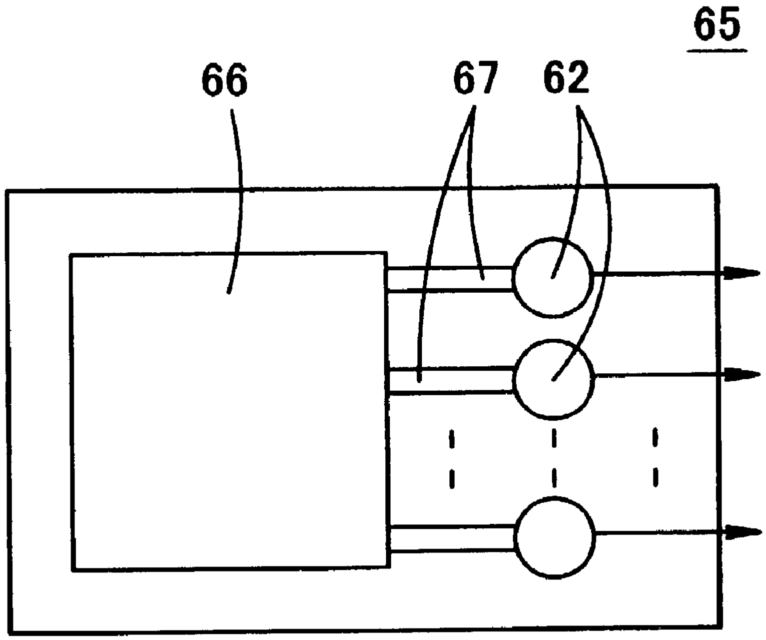
FIG. 42 shows a schematic drawing that indicates a measuring device using an electrostatic micro-relay in accordance with the present invention.

FIG. 42 is a schematic drawing that shows a measuring device 65 using an electrostatic micro-relay 62 in accordance with the present invention. In this measuring device 65, the electrostatic micro-relay 62 is connected in the middle of each signal line 67 that reaches each measuring subject (not shown) from the inner circuit 66; thus, the electrostatic micro-relays 62 are turned on and off so that the measuring subjects are switched.

Figure 43:
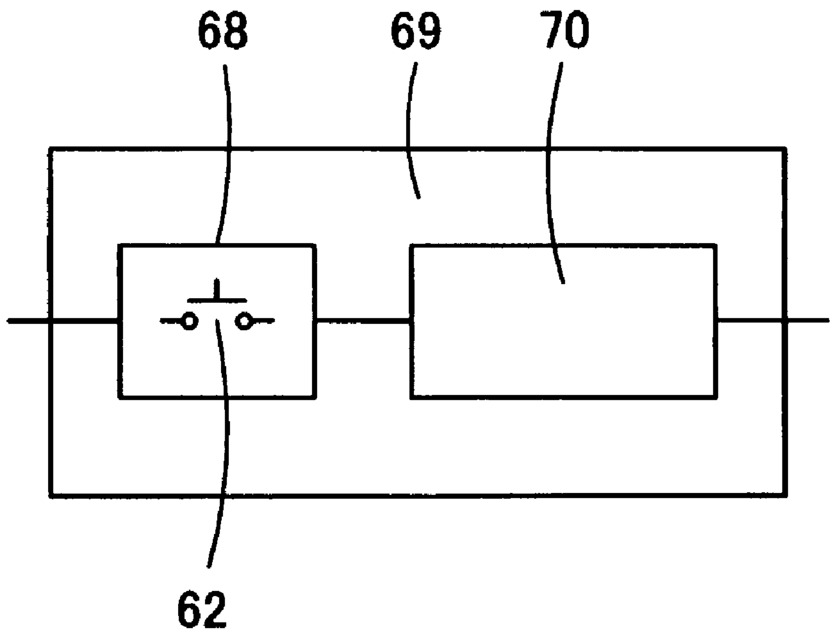
FIG. 43 shows a schematic drawing that indicates a temperature-controlling device using an electrostatic micro-relay in accordance with the present invention.

FIG. 43 is a schematic drawing that shows a temperature controlling device (temperature sensor) 68 using an electrostatic micro-relay 62 in accordance with the present invention. This temperature controlling device 68 is attached to a device 69 that requires a safety function with respect to the temperature of the power-supply, control device and the like so that it turns on and off the circuit 70 of the subject device 69, while monitoring the temperature of the subject device 69. For example, supposing that the limit of use of the subject device 69 is one hour at not less than 100° C., the temperature controlling device 68 measures the temperature of the subject device 69, and when it detects that the device 69 has been operated for one hour at not less than 100° C., the electrostatic micro-relay 62 inside the temperature controlling device 68 forcefully cuts off the circuit 70.

Figure 44:
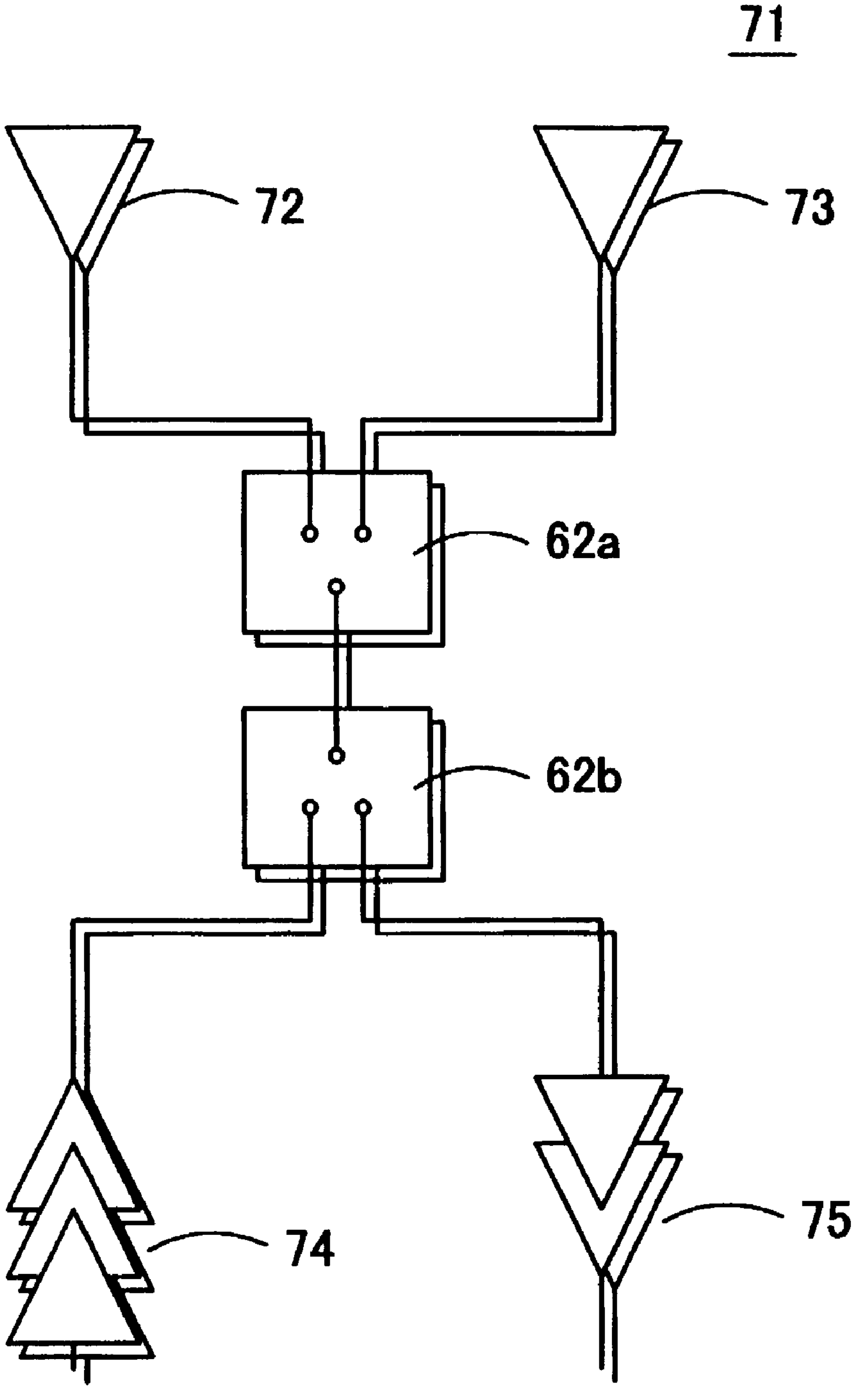
FIG. 44 shows a schematic drawing that indicates a portable terminal using an electrostatic micro-relay in accordance with the present invention.

FIG. 44 is a schematic drawing that shows a portable terminal 71 such as a cellular phone in which an electrostatic micro-relay in accordance with the present invention is used. In this portable terminal 71, two electrostatic micro-relays **62*a*, 62*b* are used. One electrostatic micro-relay 62*a* has a function for switching an inner antenna 72 and an outer antenna 73, and the other electrostatic micro-relay 62*b* has a function for switching signal flows to a power amplifier 74 on the signal transmission circuit side and a low-noise amplifier 75** on the signal receiving circuit side.

The electrostatic micro-relay of the present invention makes it possible to transmit de currents as well as high-frequency signals with low loss, and consequently to maintain a stable characteristic for a long time; thus, by applying this to the above-mentioned radio device 61, the measuring device 65 and the like, it becomes possible to transmit signals with high precision for a long time while reducing the load imposed on the amplifier, etc. used in the inner circuit. Moreover, it is possible to miniaturize the device and also to reduce power consumption; thus, the present invention is highly effective in radio devices that are driven by batteries and measuring devices a plurality of which are used.

In the case of a low-electric-potential driving device, a dissociation occurs between an applied voltage and a driving voltage due to a charge accumulated in the insulating film, with the result that the applied voltage between the movable electrode and the fixed electrode is not made coincident with the driving voltage Vdrive that is externally applied. Normally, the phenomenon of this type is only recognized as a failure in an electrostatic actuator; however, the present invention makes it possible to utilize this phenomenon as an advantage of the electrostatic actuator. For the first example, there is a case in which an electrostatic relay to be driven by 10 volts is assembled in a circuit in which only an application voltage of three volts is prepared. Even in this case, by designing the circuit so as to accumulate an electric potential of +7 volts between the movable electrode and the fixed electrode by charging through the charge controlling technique, it becomes possible to obtain an application voltage of 10 volts even in the case of the driving voltage of 3 volts; thus, it is possible to operate the electrostatic relay without causing any problems even in this case. In contrast, in the case when an electrostatic relay to be driven by 3 volts is assembled in a substrate which is designed to be driven by an applied voltage of 10 volts, by designing the charge controlling operation so as to accumulate an electric potential of −7 volts between the movable electrode and the fixed electrode by charging, it is possible to provide a apparent substrate that is equivalently controlled by an electrostatic relay to be driven by 10 volts. These ways of use may be applied not only to an electrostatic relay but also to a switch, an electrostatic capacitive sensor and the like.

In accordance with the electrostatic actuator of the present invention, it is possible to control the quantities of positive and negative charges in the insulating film by utilizing its charge-quantity controlling structure. For example, it is possible to reduce the quantity of positive or negative charge due to charge transfer and the like, or to reduce the quantity of positive or negative charge due to ionic charging and the like.

Moreover, the quantities of positive and negative charges to be generated in the above-mentioned insulating film when a voltage is applied between the first and second electrodes are respectively controlled so that the sum of the quantities of charge in the insulating film is desirably controlled; thus, the quantity of positive charge and the quantity of negative charge are mutually cancelled so that the entire charge quantity (total quantity) generated in the insulating film is controlled. In particular, it is not necessary to reduce the quantity of positive charge and the quantity of negative charge, and by making the quantity of positive charge and the quantity of negative charge cancel with each other, it becomes possible to reduce the entire charge quantity generated in the insulating film, and consequently to control the charge quantity as a whole to, for example, zero.

As a result, the electrostatic actuator of the present invention makes it possible to control the charging phenomena such as plus shift and minus shift, and consequently to control the operational voltage characteristics such as on-voltage and off-voltage.

What is claimed is:

1. A method of controlling operating voltage characteristics of an electrostatic actuator, comprising:

providing the electrostatic actuator comprising:

a first electrode;

a second electrode facing the first electrode; and an insulating film formed on at least one of the first electrode and the second electrode, wherein the second electrode comes into contact with the first electrode through the insulating film when a voltage is applied between the first electrode and the second electrode; and selecting a contact area of the insulating film with the first electrode, the second electrode, or another insulating film such that a shift amount of the operating voltage characteristics depending on the thickness of the insulating film is substantially offset by a shift amount of the operating voltage characteristics depending on the contact area of the insulating film with the first electrode, second electrode, or another insulating film, wherein at least one protrusion is disposed on a contact surface of at least one of the first electrode, second electrode, and the insulating film, and the contact area is selected by a size and shape of the at least one protrusion, wherein the thickness of the at least one insulating film is set to 2000 to 2500 angstroms, the height of the at least one protrusion is set to 400 to 600 angstroms, the diameter of the at least one protrusion is set to 25 to 35 micrometers, and the at least one protrusion is formed with pitches set to 100 to 110 micrometers.

2. A method of controlling operating voltage characteristics of an electrostatic actuator, comprising:

providing the electrostatic actuator comprising:

a first electrode;

a second electrode facing the first electrode; and an insulating film formed on at least one of the first electrode and the second electrode, wherein the second electrode comes into contact with the second electrode through the insulating film when a voltage is applied between the first electrode and the second electrode; and selecting a thickness of the insulating film and a contact area of the insulating film with the first electrode, the second electrode, or another insulating film such that a shift amount of the operating voltage characteristics depending on the thickness of the insulating film is substantially offset by a shift amount of the operating voltage characteristics depending on the contact area of the insulating film with the first electrode, the second electrode, or another insulating film, wherein at least one protrusion is disposed on a surface of at least one of the first electrode, second electrode, and the insulating film, and the contact area is selected by a size and shape of the at least one protrusion, wherein the thickness of the at least one insulating film is set to 2000 to 2500 angstroms, the height of the at least one protrusion is set to 400 to 600 angstroms, the diameter of the at least one protrusion is set to 25 to 35 micrometers, and the at least one protrusion is formed with the pitch set to 100 to 110 micrometers.

3. The method according to claim 1, wherein the at least one protrusion is formed in a dome shape.

4. The method according to claim 2, wherein the at least one protrusion is formed in a dome shape.

* * * * *